(12) United States Patent
Masuda et al.

(10) Patent No.: US 8,860,876 B2
(45) Date of Patent: Oct. 14, 2014

(54) IMAGE DISPLAY USING FLASH REACH INFORMATION

(75) Inventors: Atsushi Masuda, Tokyo (JP); Takeshi Harano, Ibaraki (JP); Naho Suzuki, Tokyo (JP); Masayuki Yoshii, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/358,566

(22) Filed: Jan. 26, 2012

(65) Prior Publication Data

US 2012/0194732 A1    Aug. 2, 2012

(30) Foreign Application Priority Data

Feb. 2, 2011    (JP) .................................. 2011-020712

(51) Int. Cl.
| | |
|---|---|
| *H04N 5/222* | (2006.01) |
| *G03B 15/03* | (2006.01) |
| *H04N 5/225* | (2006.01) |
| *H04N 5/235* | (2006.01) |
| *G03B 7/16* | (2014.01) |
| *H04N 5/232* | (2006.01) |
| *G03B 17/20* | (2006.01) |

(52) U.S. Cl.
CPC .............. *H04N 5/2256* (2013.01); *G03B 15/03* (2013.01); *H04N 5/2354* (2013.01); *G03B 7/16* (2013.01); *H04N 5/23293* (2013.01); *G03B 17/20* (2013.01)

USPC ....................... 348/370; 348/371; 348/333.02

(58) Field of Classification Search
USPC .......... 348/333.01–333.04, 370–371; 396/60, 396/61
See application file for complete search history.

(56) References Cited

U.S. PATENT DOCUMENTS

| | | | |
|---|---|---|---|
| 8,208,061 B2* | 6/2012 | Cheng et al. ................... | 348/370 |
| 2008/0079811 A1* | 4/2008 | Park et al. ...................... | 348/175 |
| 2008/0088707 A1* | 4/2008 | Iwaki et al. ................. | 348/208.1 |
| 2008/0231742 A1* | 9/2008 | Kurase ....................... | 348/333.01 |
| 2009/0244317 A1* | 10/2009 | Makii .......................... | 348/229.1 |
| 2009/0244318 A1* | 10/2009 | Makii .......................... | 348/229.1 |
| 2009/0245685 A1* | 10/2009 | Makii ............................ | 382/276 |
| 2010/0317398 A1* | 12/2010 | Thorn ......................... | 455/556.1 |

FOREIGN PATENT DOCUMENTS

| | | |
|---|---|---|
| JP | 10-090778 A | 4/1998 |
| JP | 10-333235 A | 12/1998 |

* cited by examiner

*Primary Examiner* — Kelly L Jerabek
(74) *Attorney, Agent, or Firm* — Wolf, Greenfield & Sacks, P.C.

(57) ABSTRACT

An apparatus includes a display control section configured to control display of image data for an image, the image data including flash reach information identifying at least one portion of the image corresponding to at least one region reached by light from a flash. Also described are a method and computer-readable storage medium for controlling display of image data for the image.

20 Claims, 18 Drawing Sheets

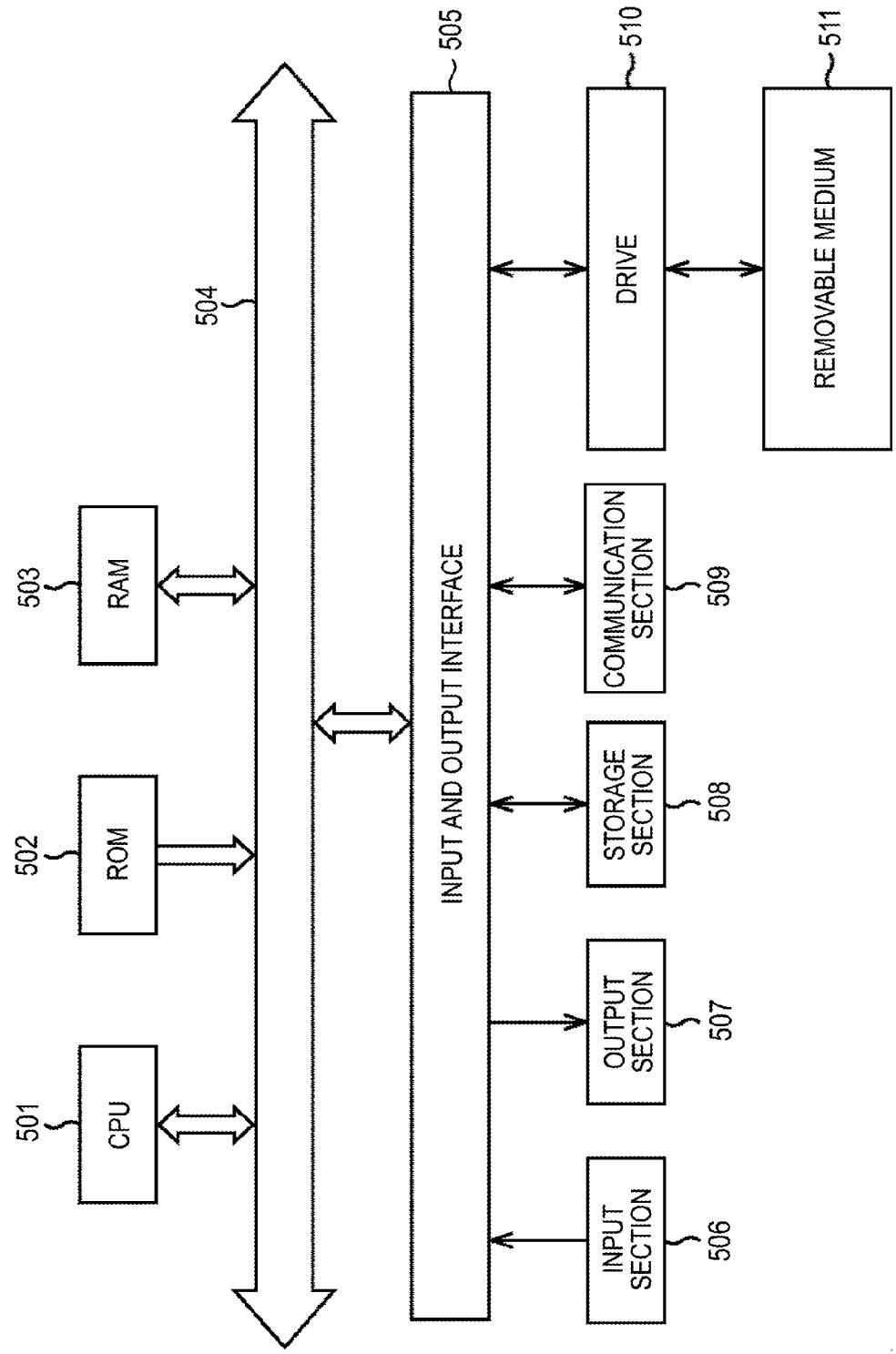

IMAGE DISPLAY USING FLASH REACH INFORMATION

FIELD

The present disclosure relates to a photographing apparatus, a display control method, and a program, and particularly, to a photographing apparatus, a display control method, and a program which are capable of easily displaying a reach region of a flash light.

BACKGROUND

Many devices, having a photographing function, such as digital cameras or cellular phones sold in recent years have been provided with a flash (flash light) photographing mode. When flash photographing is performed using such devices in a dark environment such as dusk or night, subjects located at a relatively short distance which the flash light reaches are photographed at an adequate luminance or brightly, and subjects which the flash light does not reach are darkly photographed. Normally, adjustment of exposure at the time of photographing is performed on the basis of the luminance of the subject located at a short distance.

The luminance of a distant background and the like is darker than that of a near subject when viewed on a through-the-lens image. For this reason, when photographing is performed with intent to capture the atmosphere of the background viewed on a through-the-lens image, an image having a darkened background is often photographed.

Consequently, techniques for intuitively transmitting the ranges which the flash light reaches to users before taking a photograph are proposed. For example, JP-A-10-333235 discloses a technique for displaying a region of a subject located at a distance which the flash light is able to reach, when flash photographing is performed.

SUMMARY

In the technique disclosed in JP-A-10-333235, it is necessary to pre-emit a flash before main photographing, and the time for recharging the power consumed by the pre-emission or the like takes an interval before the main photographing.

Thus, it is desirable to easily display a reach region of a flash light.

Some embodiments relate to an apparatus that includes a display control section configured to control display of image data for an image. The image data includes flash reach information identifying at least one portion of the image corresponding to at least one region reached by light from a flash.

Some embodiments relate to a method that includes controlling display of image data for an image. The image data includes flash reach information identifying at least one portion of the image corresponding to at least one region reached by light from a flash.

Some embodiments relate to a computer-readable storage medium comprising instructions, which, when executed by a processor, perform a method that includes controlling display of image data for an image. The image data includes flash reach information identifying at least one portion of the image corresponding to at least one region reached by light from a flash.

According to the embodiments of the present disclosure, it is possible to easily display a region which flash light reaches.

BRIEF DESCRIPTION OF THE DRAWINGS

FIG. 19 is a diagram illustrating a configuration example of a computer.

DETAILED DESCRIPTION

First Embodiment

[External Configuration of Photographing Apparatus]

Figure 1:
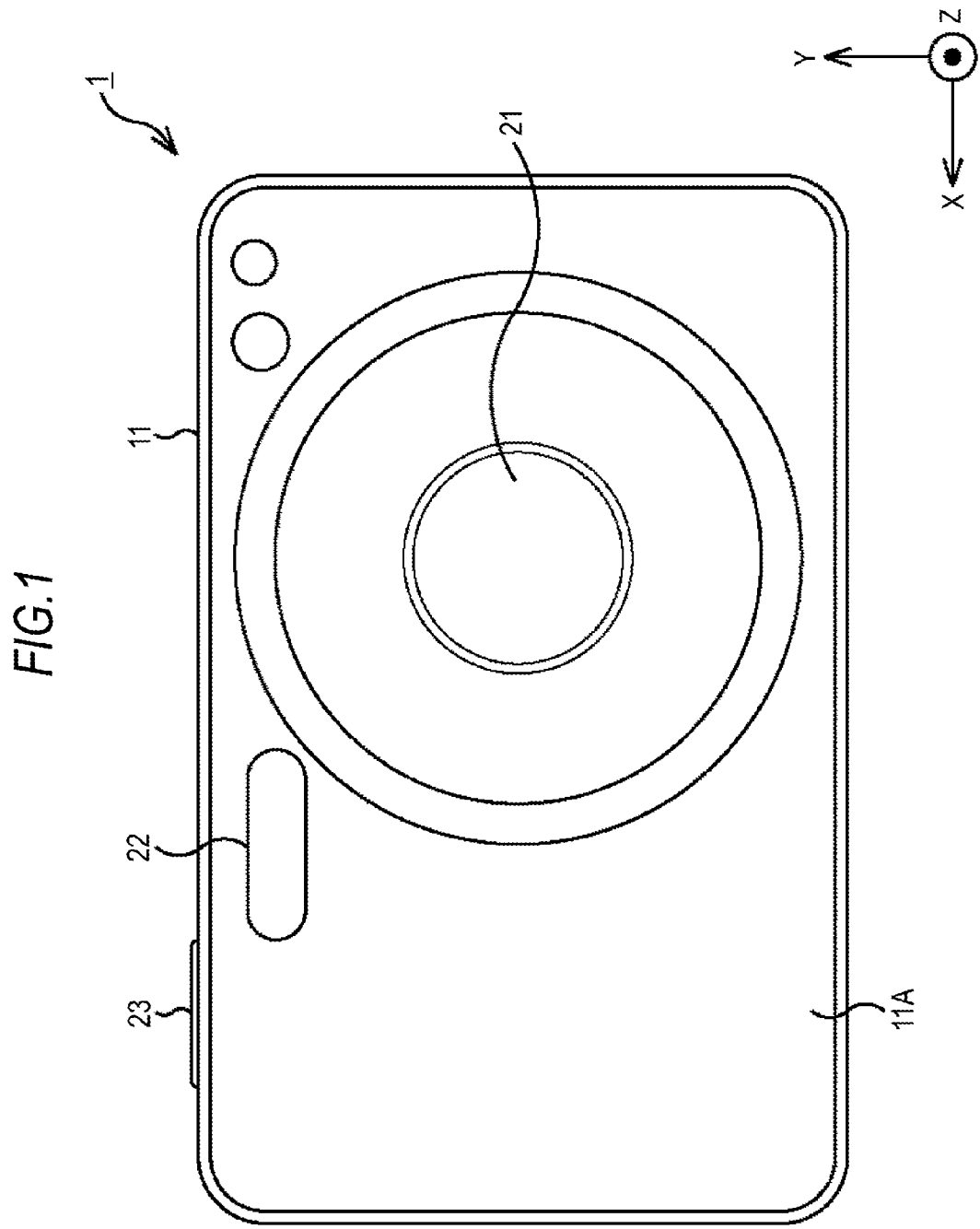
FIG. 1 is a diagram illustrating an example of the front appearance of a photographing apparatus according to an embodiment of the present disclosure.

FIG. 1 is a diagram illustrating an example of the front appearance of a photographing apparatus according to an embodiment of the present disclosure.

A photographing apparatus 1 of FIG. 1 is a compact-type digital still camera. A lens 21 is provided at a position on the central right side of a front 11A of a camera body 11, and a flash 22 which is a built-in flash is provided at the upper left of the lens 21.

The lens 21 includes a lens group composed of a plurality of lenses serially disposed along the optical axis. A focus lens for an adjustment of the focus and a zoom lens for a change in the magnification are included in the lens group constituting the lens 21, and each of the lenses is driven in the direction of the optical axis, so that the change in the magnification or the adjustment of the focus is performed. The lens 21 captures light (light image) from a subject, and leads the light to an imaging device disposed in the inside of the camera body 11.

A shutter button 23 is provided on the upper surface of the camera body 11. The shutter button 23 is a switch that can be halfway pressed so as to be in the "half-pressed state" and can be further pressed so as to be in the "fully-pressed state". When the shutter button 23 is half pressed in the still image photographing mode, a preparatory operation for photographing a still image is executed. When the shutter button is fully pressed in this state, a photographing operation is executed. The preparatory operation includes operations such as focus detection or setting of photographing parameters which are exposure control values such as a shutter speed, an aperture value, and an ISO speed. In addition, the photographing operation includes a series of operations of performing predetermined image processing on an image signal obtained by exposing the imaging device and recording image data in a storage medium such as a memory card (i.e., a tangible, non-transitory storage medium).

A main switch (not shown) of a push switch is also provided on the upper surface of the camera body 11, and switches on/off of a power source of the photographing apparatus 1 whenever pushed down.

Figure 2:
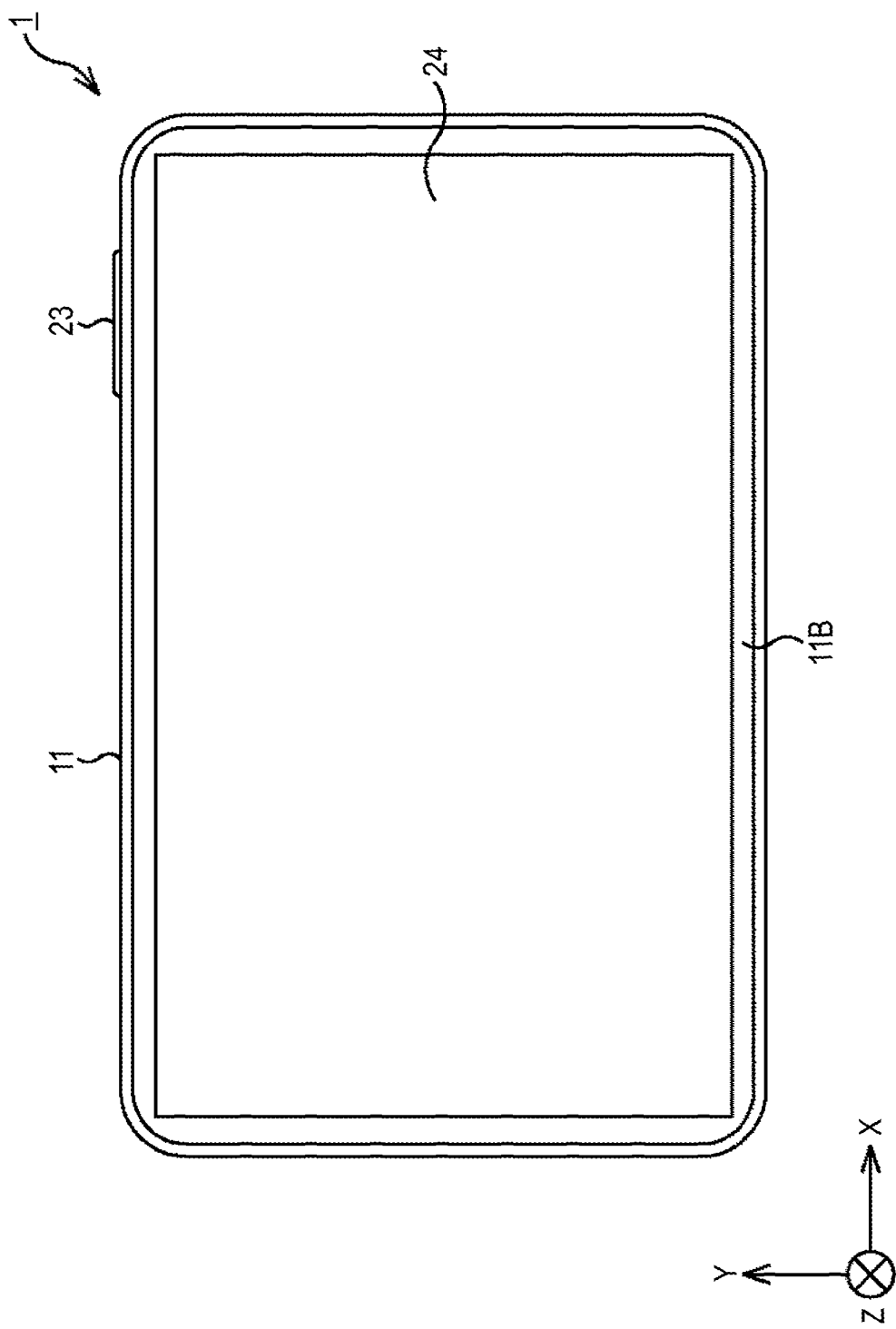
FIG. 2 is a diagram illustrating an example of the rear appearance of the photographing apparatus.

FIG. 2 is a diagram illustrating an example of the rear appearance of the photographing apparatus 1.

An LCD (Liquid Crystal Display) 24 on a touch panel is superimposed is provided at a rear 11B of the photographing apparatus 1. A settings screen on which various types of buttons line up is displayed on the LCD 24, in addition to a through-the-lens image or a recorded image which is an image of a field (photographing range) captured. The settings screen displayed on the LCD 24 is used in setting, for example, functions or modes provided in the photographing apparatus 1. Another display such as an organic EL display may be provided in place of the LCD 24.

In the photographing apparatus 1 having such an external configuration, when a still image is photographed by emitting the flash 22, information indicating a flash reach region which is a region of a subject (object) which the flash light reaches is displayed before photographing, for example, superimposed on the through-the-lens image. The determination of which region is a flash reach region is performed on the basis of the distance up to each subject included in the field, the emission amount of the flash 22, and the like.

That is, in the photographing apparatus 1, the determination of the flash reach region is performed without pre-emission. Thereby, since it is not necessary to perform a recharge and the like of the flash 22 after pre-emission, the information indicating the flash reach region can be easily displayed as compared to the performing of pre-emission. A series of processes of displaying the information indicating the flash reach region will be described later in detail.

[Internal Configuration of Photographing Apparatus]

Figure 3:
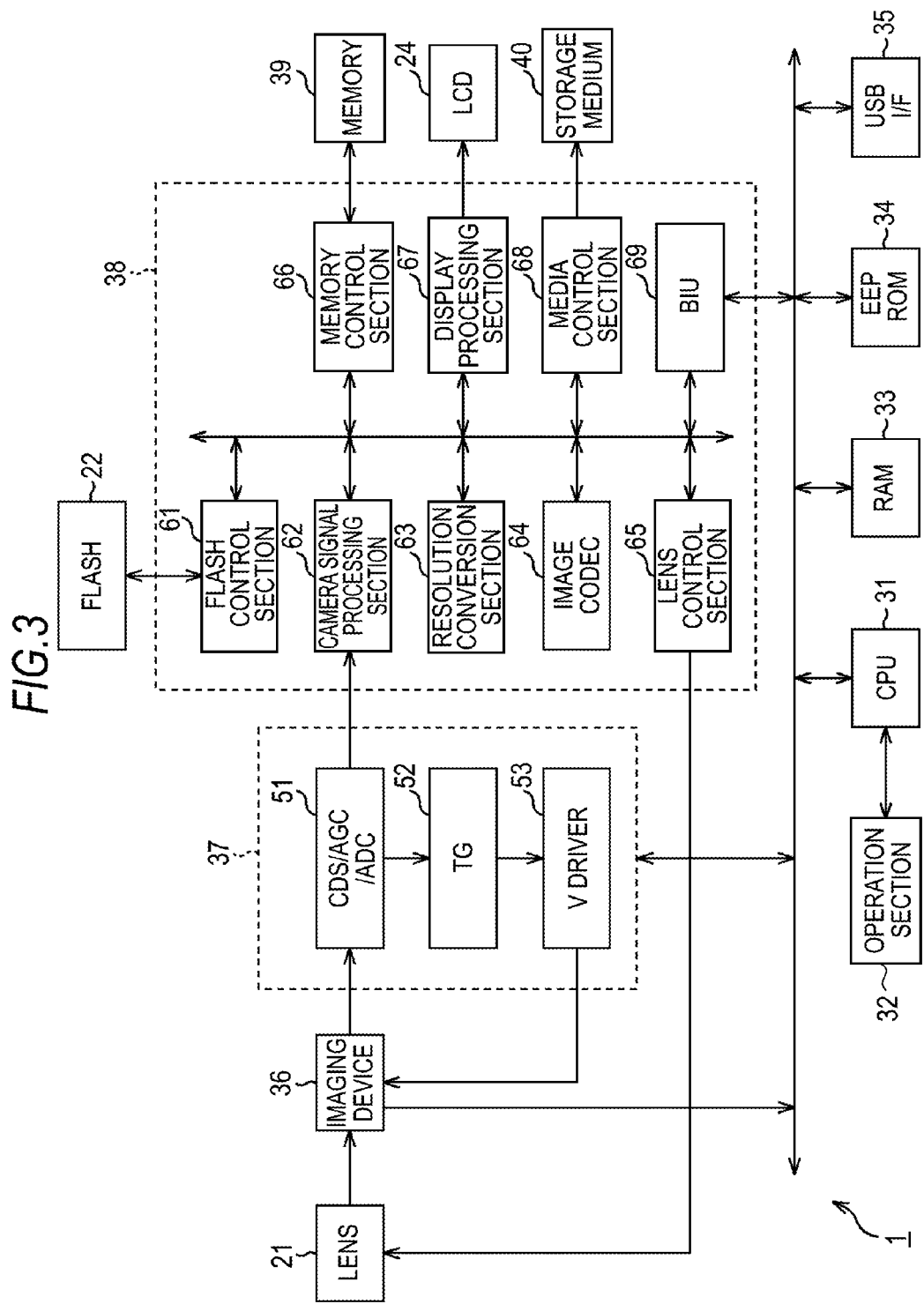
FIG. 3 is a diagram illustrating an example of the internal configuration of the photographing apparatus.

FIG. 3 is a diagram illustrating an example of the internal configuration of the photographing apparatus 1. The same signs and numerals are assigned to the same components as those shown in FIGS. 1 and 2 of the components shown in FIG. 3.

A CPU 31 executes a program stored in an EEPROM 34 in a RAM 33, and controls the entire operation of the photographing apparatus 1 in accordance with the contents of a user's operation indicated by information supplied from an operation section 32. The RAM (Random Access Memory) 33, the EEPROM (Electrically Erasable and Programmable Read Only Memory) 34, a USB (Universal Serial Bus) I/F 35 are connected to the CPU (Central Processing Unit) 31 through a bus. An imaging device 36, a preprocessing section 37, and a camera DSP (Digital Signal Processor) section 38 are also connected to the bus.

The operation section 32 detects a user's operation regarding various types of input sections such as the shutter button 23 and the touch panel of the LCD 24, and outputs information indicating the contents of the user's operation to the CPU 31.

The USB I/F 35 is an interface corresponding to a USB storage class. The USB I/F 35 transmits and receives data to and from external devices such as a personal computer connected through a USB cable.

The imaging device 36 is a solid-state imaging device such as a CMOS (Complementary Metal Oxide Semiconductor) sensor. The imaging device 36 is disposed on the XY plane which is a plane perpendicular to the Z-axis of FIGS. 1 and 2. The imaging device 36 performs photoelectric conversion of light captured by the lens 21, and outputs an image signal. In addition, the imaging device 36 also functions as a phase difference sensor, and outputs a phase difference signal indicating the phase difference of light from each subject included in the field.

Figure 4:
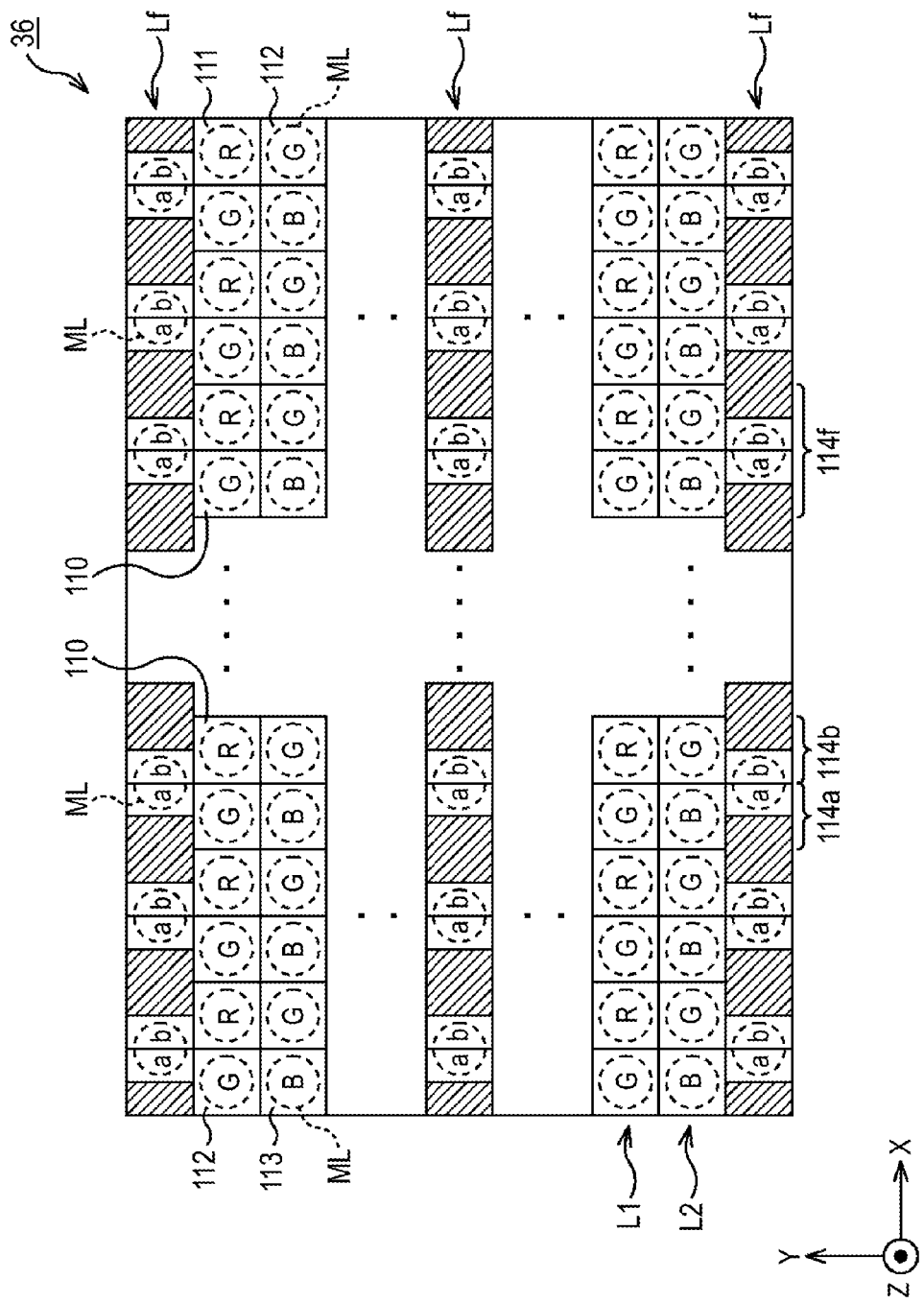
FIG. 4 is a diagram illustrating a configuration example of an imaging device.

FIG. 4 is a diagram illustrating a configuration example of the imaging device 36.

The imaging device 36 receives light transmitted through the portion having a different exit pupil, thereby allowing the phase difference of light from the subject to be detected. As shown in FIG. 4, the imaging device 36 is basically composed of each pixel of RGB and pixels constituting a pixel pair 114*f*.

An R pixel 111, a G pixel 112, and a B pixel 113 are, respectively, normal pixels in which color filters of R (red), G (green) and B (blue) are arranged between a microlens ML, shown by a dashed circle, functioning as a condensing lens and a photodiode. Hereinafter, appropriately, the R pixel 111, the G pixel 112, and the B pixel 113 are collectively called a normal pixel 110. In the imaging device 36, image information is acquired by the normal pixel 110 having a larger number of pixels than the number of pixels constituting the pixel pair 114*f*.

A line L1 in which the G pixel 112 and the R pixel 111 are alternately disposed and a line L2 in which the B pixel 113 and the G pixel 112 are alternately disposed are formed in the imaging device 36, as a normal pixel line Ln which is a line of the normal pixel 110 in the horizontal direction. The line L1 and the line L2 are alternately disposed in the vertical direction, and thus a Bayer array of the normal pixels 110 having a ratio of RGB of 1:2:1 is realized.

On the other hand, the pixel pair 114*f* is composed of a pixel 114*a* and a pixel 114*b* which are pixels disposed across the optical axis of the microlens ML in order to receive a light flux from the left portion of an exit pupil of the lens 21 and a light flux from the right portion thereof by separation (pupil split) from each other. The photodiodes provided in the pixel 114*a* and the pixel 114*b* have the same size as that of the photodiode of the normal pixel 110, and are disposed adjacent to the horizontal direction at the same pitch as that of the normal pixel 110. In the imaging device 36, the pixel pairs 114*f* are arranged in the horizontal direction, so that pixel pair lines Lf are periodically formed in the vertical direction.

In this manner, in the imaging device 36, the pixel pairs 114*f* having a pupil splitting function are periodically disposed in the entire imaging device 36. It is possible to detect the phase difference of light from each subject included in the entire field, on the basis of a light reception data series obtained in the pixel 114*a* of each position and a light reception data series obtained in the pixel 114*b* of each position. In addition, it is possible to calculate the distance up to each subject, on the basis of the detected phase difference. Such an imaging device which is composed of the normal pixels and the phase difference pixel (pixels 114*a* and 114*b*) for detecting the phase difference by pupil-splitting subject light and has a function of detecting the phase difference on the device is disclosed in, for example, JP-A-2010-169709.

A phase difference detection sensor is provided separately from the imaging device 36 without detecting the phase difference of light from each subject included in the field on the imaging device 36, and thus the phase difference of light from each subject may be detected in the phase difference detection sensor.

The image signal obtained by the normal pixel of the imaging device 36 is supplied to the preprocessing section 37. In addition, the phase difference signal obtained by the phase difference pixel of the imaging device 36 is supplied to the CPU 31 as phase difference information after A/D conversion and the like thereof is performed in a circuit which is not shown.

The preprocessing section 37 is composed of a CDS/AGC/ADC section 51, a timing generator (TG) 52, and a V driver 53.

The CDS/AGC/ADC section 51 has a CDS (Correlated Double Sampling) function, an AGC (Automatic Gain Control) function, and an ADC (Analog to Digital Converter) function. That is, the CDS/AGC/ADC section 51 performs correlation double sampling of the image signal supplied from the imaging device 36, and generates, for example, a primary color-based color signal. In addition, the CDS/AGC/ADC section 51 corrects the signal level of the color signal through the automatic acquisition control and then performs A/D conversion, and outputs image data obtained by the A/D conversion to the camera DSP section 38.

The TG 52 generates various types of timing signals serving as a drive reference of the imaging device 36, and outputs the timing signals to the V driver 53.

The V driver 53 drives the imaging device 36 in accordance with the timing signal supplied from the TG 52.

The camera DSP section 38 is composed of a flash control section 61, a camera signal processing section 62, a resolution conversion section 63, an image codec 64, a lens control section 65, a memory control section 66, a display processing section 67, a media control section 68, and a BIU 69 which are connected to one another through a bus. The camera DSP section 38 switches an operation in accordance with the control by the CPU 31, and performs recording/reproduction processing on image data supplied from the preprocessing section 37. A memory 39 is a working memory in each section located within the camera DSP section 38, and writing of data to the memory 39 and readout of data from the memory 39 are controlled by the memory control section 66.

When photographing with flash light is instructed, the flash control section 61 emits the flash 22 in time with the photographing timing of the imaging device 36. The emission amount of the flash 22 is also appropriately adjusted by the flash control section 61.

The camera signal processing section 62 performs various types of signal processing, such as white balance adjustment processing and gamma correction processing, on image data supplied from the preprocessing section 37, and outputs the image data obtained by performing the signal processing to the resolution conversion section 63. In addition, the camera signal processing section 62 outputs the image data obtained by performing the signal processing to the memory control section 66, and stores the image data to the memory 39. The camera signal processing section 62 detects information necessary for correction of an aperture value and adjustment of an automatic focus from the image data, and also outputs the detected information to the lens control section 65.

The resolution conversion section 63 performs resolution conversion on the image data supplied from the camera signal processing section 62, and outputs the image data after the resolution conversion to the display processing section 67. For example, when the photographing result by the imaging device 36 is displayed on the LCD 24 on a through-the-lens image, the resolution conversion section 63 performs the resolution conversion of the image of the photographing result in accordance with the resolution of the LCD 24. In addition, the resolution conversion section 63 performs resolution conversion when the resolution of the image recorded in a storage medium 40 is instructed by a user, or processing of cutting out a region of a portion of the photographing result to convert the resolution when a digital zoom or a reproduction zoom is instructed, and the like.

The image codec 64 compresses and outputs image data which are output from the camera signal processing section 62 and are stored in the memory 39. The compressed image data are supplied to, for example, the media control section 68, and are stored in the storage medium 40. In addition, when reproduction of the recorded image is instructed and the compressed image data read out from the storage medium 40 are supplied from the media control section 68, the image codec 64 extends and outputs the recorded image. The extended image data are supplied to, for example, the display processing section 67, and are displayed on the LCD 24. In a type of compression and extension of data, a type of JPEG (Joint Photographic Coding Experts Group) and the like are used with respect to a still image. In addition, a type of a motion vector such as ISO/IEC JTC1/SC29WG11 MPEG (Motion Picture Experts Group) 1, MPEG2, MPEG4, ITU-T H.263, and H.264/MPEG4-AVC (Advanced Video Coding) is used with respect to a motion picture.

The lens control section 65 controls the aperture of the lens 21 in accordance with information supplied from the camera signal processing section 62. In addition, the lens control section 65 controls the focus of the lens 21 by a so-called hill-climbing method. The lens control section 65 also performs adjustment and the like on the zoom of the lens 21 in accordance with the control by the CPU 31.

The display processing section 67 displays the through-the-lens image in which the resolution conversion is performed by the resolution conversion section 63 or the recorded image extended by the image codec 64, on the LCD 24. In addition, the display processing section 67 displays various types of setting screens or information indicating the flash reach region on the LCD 24 in accordance with the control by the CPU 31.

The media control section 68 controls recording of data in the storage medium 40 and readout of data from the storage medium 40. The storage medium 40 is, for example, a memory card having a semiconductor memory therein. Various storage mediums such as a hard disk can also be used in place of the memory card. For example, when the image data are recorded, the media control section 68 records the image data compressed by the image codec 64 in the storage medium 40. In addition, when the image data is reproduced, the media control section 68 reads out the image data recorded in the storage medium 40, and outputs the image data to the image codec 64.

The BIU (Bus Interface Unit) 69 is an interface between the CPU 31 and each section of the camera DSP section 38, and controls input and output or the like of commands from the CPU 31 regarding the control of each section of the camera DSP section 38.

In the photographing apparatus 1 having such an internal configuration, for example, when photographing instructions are detected on the basis of a signal from the operation section 32, the CPU 31 controls the preprocessing section 37 to sequentially perform processing on the photographing result of a motion picture by the imaging device 36. In addition, the CPU 31 controls the camera signal processing section 62 within the camera DSP section 38 to perform the signal processing for the processing result by the preprocessing section 37 and sequentially store the resultant in the memory 39 through the memory control section 66. The CPU 31 controls the resolution conversion section 63 to perform the resolution conversion of the image data which are a photographing result sequentially stored in the memory 39, and controls the display processing section 67 to display an image on the basis of the image data after the resolution conversion. In this manner, the CPU 31 displays a monitor image of the photographing result on the LCD 24, while recording the photographing result of the motion picture in the memory 39.

In addition, when the photographing of the still image is instructed by a user in this state, the CPU 31 stops storage of the image data output from the camera signal processing section 62 in the memory 39. The CPU 31 supplies image data, to the resolution conversion section 63, which are captured by the imaging device 36 when the photographing of the still image is instructed and are stored in the memory 39 through the preprocessing section 37 and the camera DSP section 38, and controls the resolution conversion section to convert the image data into image data of the resolution instructed by a user. In addition, the CPU 31 controls the image codec 64 to compress the image data obtained by the resolution conversion, and then stores the image data in the storage medium 40. In such a series of processing, the CPU 31 instructs the resolution conversion section 63 to create a thumbnail image and create a thumbnail image for an index. The CPU 31 stores the created thumbnail image in the storage medium 40 as an image for an index of the photographing result.

On the other hand, when the photographing start of the motion picture is instructed by a user, the CPU 31 stops storage of the image data output from the camera signal processing section 62 in the memory 39. The CPU 31 controls the resolution conversion section 63 to start the resolution conversion of the image data output from the camera signal processing section 62, and controls the image codec 64 to start compression of the image data obtained by the resolution conversion. In addition, the CPU 31 controls the media control section 68 to store the image data compressed by the image codec 64 in the storage medium 40. In such a series of processing, the CPU 31 also instructs the resolution conversion section 63 to create a thumbnail image for leading one frame at the time of recording start, and creates a thumbnail image for an index. The CPU 31 stores the created thumbnail image in the storage medium 40 as an image for an index of the photographing result.

[Functional Configuration of Photographing Apparatus]

Figure 5:
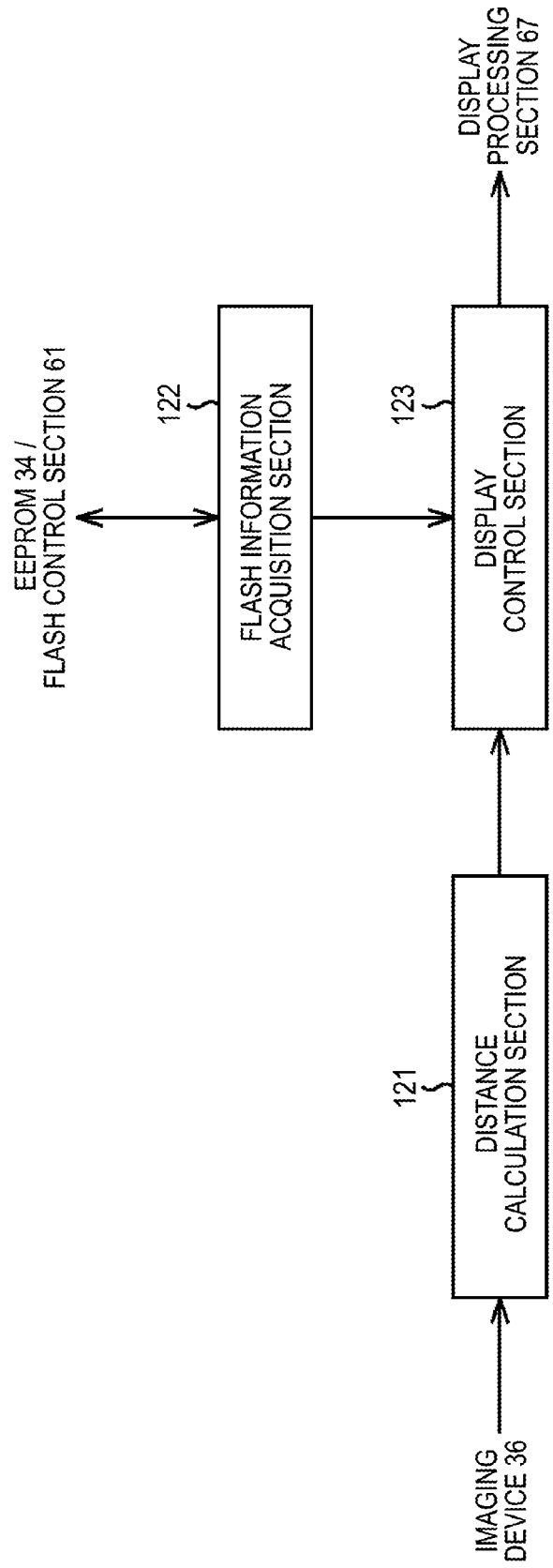
FIG. 5 is a block diagram illustrating a functional configuration example of the photographing apparatus.

FIG. 5 is a block diagram illustrating a functional configuration example of the photographing apparatus 1. At least a portion of the function sections shown in FIG. 5 is realized by execution of a predetermined program by the CPU 31.

In the photographing apparatus 1, a distance calculation section 121, a flash information acquisition section 122, and a display control section 123 are realized.

The distance calculation section 121 calculates the distance up to each subject included in the entire field, on the basis of phase difference information supplied from the imaging device 36. The distance calculation section 121 outputs information indicating the distance up to each subject calculated by an arithmetic operation to the display control section 123.

The flash information acquisition section 122 acquires a guide number (maximum emission amount) of the flash 22, and outputs the guide number to the display control section 123 as flash information. Information of the guide number of the flash 22 is stored in, for example, the EEPROM 34. In addition, when the flash used at the time of photographing is an external flash connected to a connection terminal (not shown) for the external flash, the flash information acquisition section 122 acquires a guide number from the external flash through the flash control section 61.

The display control section 123 calculates the reach distance of the flash light on the basis of flash information supplied from the flash information acquisition section 122, the ISO speed and the aperture value set as photographing parameters. The term "the reach distance of the flash light" herein means the distance which the flash light is able to reach with an amount of light, at which a photograph can be taken through a correct exposure, specified on the basis of the photographing parameters such as the ISO speed and the aperture value. The ISO speed and the aperture value may be set by the CPU 31 in accordance with the photographing mode, and may be manually set by a user.

The display control section 123 compares the reach distance of the flash light and the distance up to the subject calculated by the distance calculation section 121, and determines whether the flash light reaches each subject. It is determined which the flash light reaches the subject when it is located closer than the reach distance of the flash light. The display control section 123 controls the display processing section 67 to display information indicative of the flash reach region on a region of the subject, in which it is determined which the flash light reaches, of the respective regions of the through-the-lens image.

[Operation of Photographing Apparatus]

Here, reference will be made to a flow diagram of FIG. 6 to describe a processing operation of the photographing apparatus 1 displaying the flash reach region. The processing operation starts when a user turns on the power source of the photographing apparatus 1 to run the photographing apparatus 1.

In step S1, the CPU 31 controls the preprocessing section 37 and the camera DSP section 38 to display an image captured by the imaging device 36 on the LCD 24 as a through-the-lens image. In the imaging device 36, the photoelectric conversion of light captured by the lens 21 is performed, and various types of processing are performed on the image signal obtained by the photoelectric conversion in the preprocessing section 37. Image data obtained by performing various types of processing are supplied to the display processing section 67 through the camera signal processing section 62, and the through-the-lens image is displayed on the LCD 24. In addition, phase difference information indicating the phase difference detected by the imaging device 36 by performing the photoelectric conversion is supplied to the CPU 31 (distance calculation section 121).

In step S2, the flash information acquisition section 122 performs a flash information acquisition process. The guide number of the flash used in the flash photographing is acquired through the flash information acquisition process. The flash information acquisition process will be described later with reference to a flow diagram of FIG. 8.

In step S3, the CPU 31 performs a photographing mode selection process. A determination method of the photographing parameters and the like are set in accordance with the photographing mode selected by a user, through the photographing mode selection process. The photographing mode selection process will be described later with reference to a flow diagram of FIG. 9.

In step S4, the CPU 31 designates an AF (Auto Focus) region in the camera signal processing section 62. In the camera signal processing section 62, information necessary for adjustment of the focus is detected from image information of the AF region designated by the CPU 31, and the focus of the lens 21 is adjusted by the lens control section 65 in accordance with the detected information. For example, when a user designates the AF region in correspondence with the composition that the user desires to photograph, the AF region is set in accordance with the designation by the user. When the auto mode is selected as a photographing mode, the AF region is automatically determined by the CPU 31.

In step S5, the imaging device 36 performs photometry of the field. The CPU 31 appropriately determines the photographing parameters such as the shutter speed, the aperture value, the ISO speed, and the use or disuse of flash emission, on the basis of the selected photographing mode and the photometric result of the imaging device 36, and causes photographing to be performed using the determined photographing parameters.

In step S6, the CPU 31 determines whether the flash 22 is emitted at the time of photographing to take a photograph, that is, whether flash emission is used. For example, when the emission of the flash 22 is instructed by a user, or when the auto mode is set as a photographing mode and the luminance of the field obtained as a photometric result is darker than the threshold, it is determined that the flash emission is used.

When it is determined in step S6 that the flash emission is used, in step S7, the distance calculation section 121 calculates the distance up to each subject included in the field by an arithmetic operation. The distance calculation section 121 stores information of the distance calculated by the arithmetic operation in the RAM 33. The arithmetic operation of the distance in the distance calculation section 121 is repeatedly performed, and the distance information within the RAM 33 is updated at any time. The display control section 123 reads out the distance information stored in the RAM 33, and acquires the distance up to the subject calculated by the distance calculation section 121.

A principle of a method of calculating the distance up to the subject will be described with reference to FIG. 7. As shown in a graph Gd of FIG. 7, the relationship between the defocus amount and the difference of the barycentric position in a pair of image columns is in a proportionate relation. When this relationship is expressed by a mathematical expression by setting the defocus amount to DF (μm) and setting the difference of the barycentric position to C (μm), the following Expression (1) is obtained.

$$DF = k \times C \quad (1)$$

Figure 7:
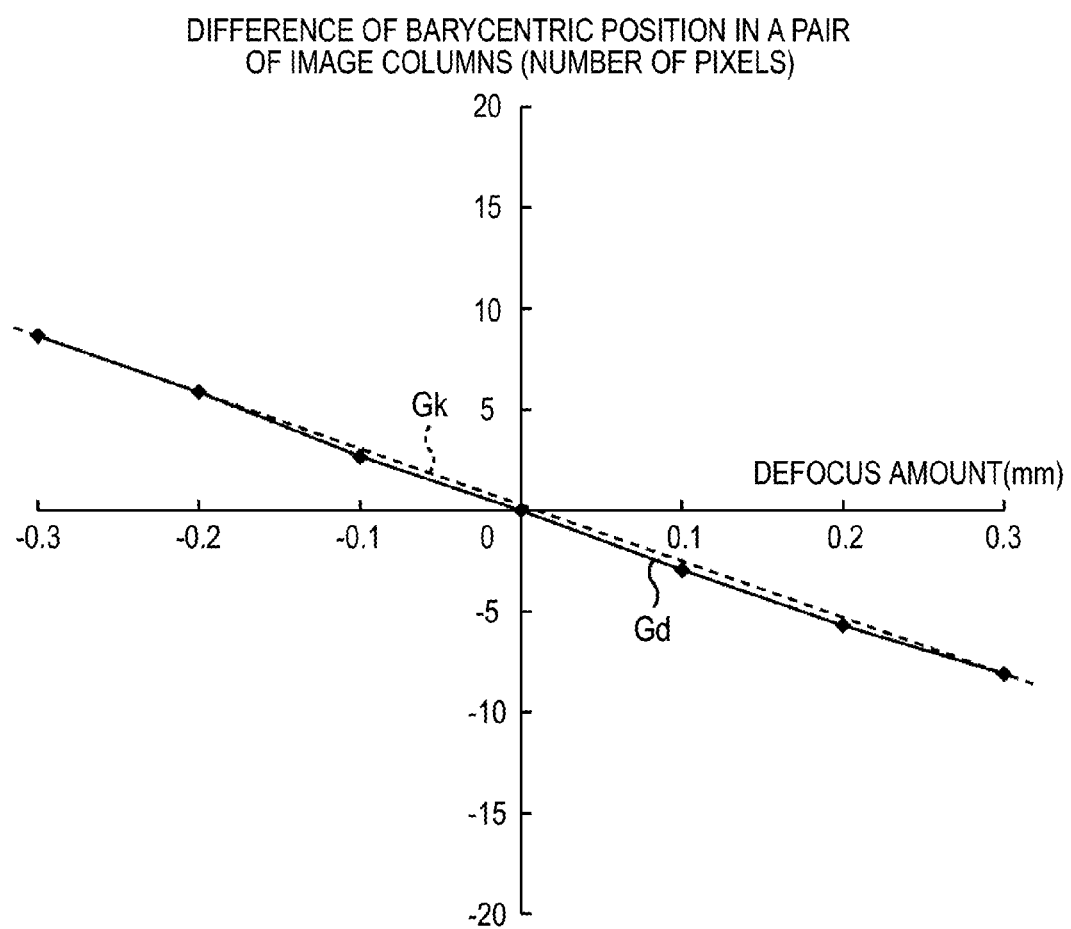
FIG. 7 is a diagram illustrating a principle of a method calculating a distance up to a subject.

Here, the coefficient k of Expression (1) indicates the slope Gk (shown in a dashed line) regarding the graph Gd of FIG. 7, and can be acquired in advance by a factory test and the like.

From the above, the distance calculation section 121 calculates the difference (phase difference) of the barycentric position with respect to A-series data and B-series data obtained from the split G pixel, and then calculates the defocus amount using the above Expression (1). Meanwhile, the above-mentioned defocus amount is uniquely determined by a design value of the lens 21.

Next, a description will be made of a calculation formula for calculating the distance x up to the subject from the lens 21 using the defocus amount DF calculated in Expression (1). When the defocus amount is set to x' and the focal distance of the lens 21 is set to f, the following Expression (2) is formed as Newton's equation. The distance x up to the subject can be calculated by substituting values for Expression (2).

$$xx' = f^2 \quad (2)$$

In step S8, the display control section 123 performs a flash reach region display process. In the flash reach region display process, determination of the flash reach region is performed, and information indicating the flash reach region is displayed superimposed on the through-the-lens image. The details of the flash reach region display process will be described later with reference to a flow diagram of FIG. 10. When it is determined in step S6 that the flash emission is not used, the processes of steps S7 and S8 are skipped.

In step S9, the CPU 31 performs photographing of the still image in accordance with the operation of the shutter button 23 by a user. When the flash emission is used, the CPU 31 controls the flash control section 61, and emits the flash 22 in time with the photographing timing.

In step S10, the CPU 31 stores a photographing result in step S9 in the storage medium 40, and terminates a series of processing.

Figure 8:
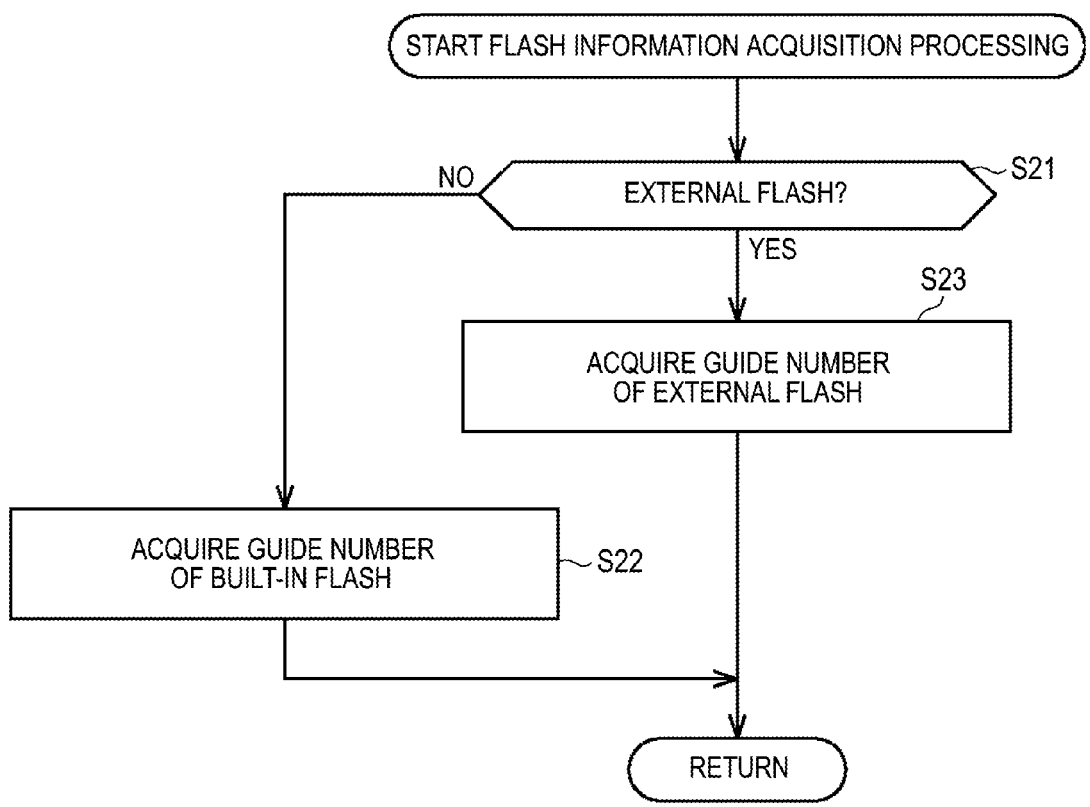
FIG. 8 is a flow diagram illustrating a flash information acquisition process performed in step S2 of FIG. 6.

Next, the flash information acquisition process performed in step S2 of FIG. 6 will be described with reference to a flow diagram of FIG. 8.

In step S21, the flash information acquisition section 122 determines whether the flash to be used is an external flash. In the case of this example, since the flash of the photographing apparatus 1 is the flash 22 which is a built-in flash, it is determined that the flash is not an external flash.

When it is determined in step S21 that the flash is not an external flash, in step S22, the flash information acquisition section 122 acquires the guide number of the flash 22 by readout from the EEPROM 34.

On the other hand, when it is determined in step S21 that the flash to be used is an external flash connected to a connection terminal (not shown), in step S23, the flash information acquisition section 122 acquires the guide number of the external flash.

Figure 6:
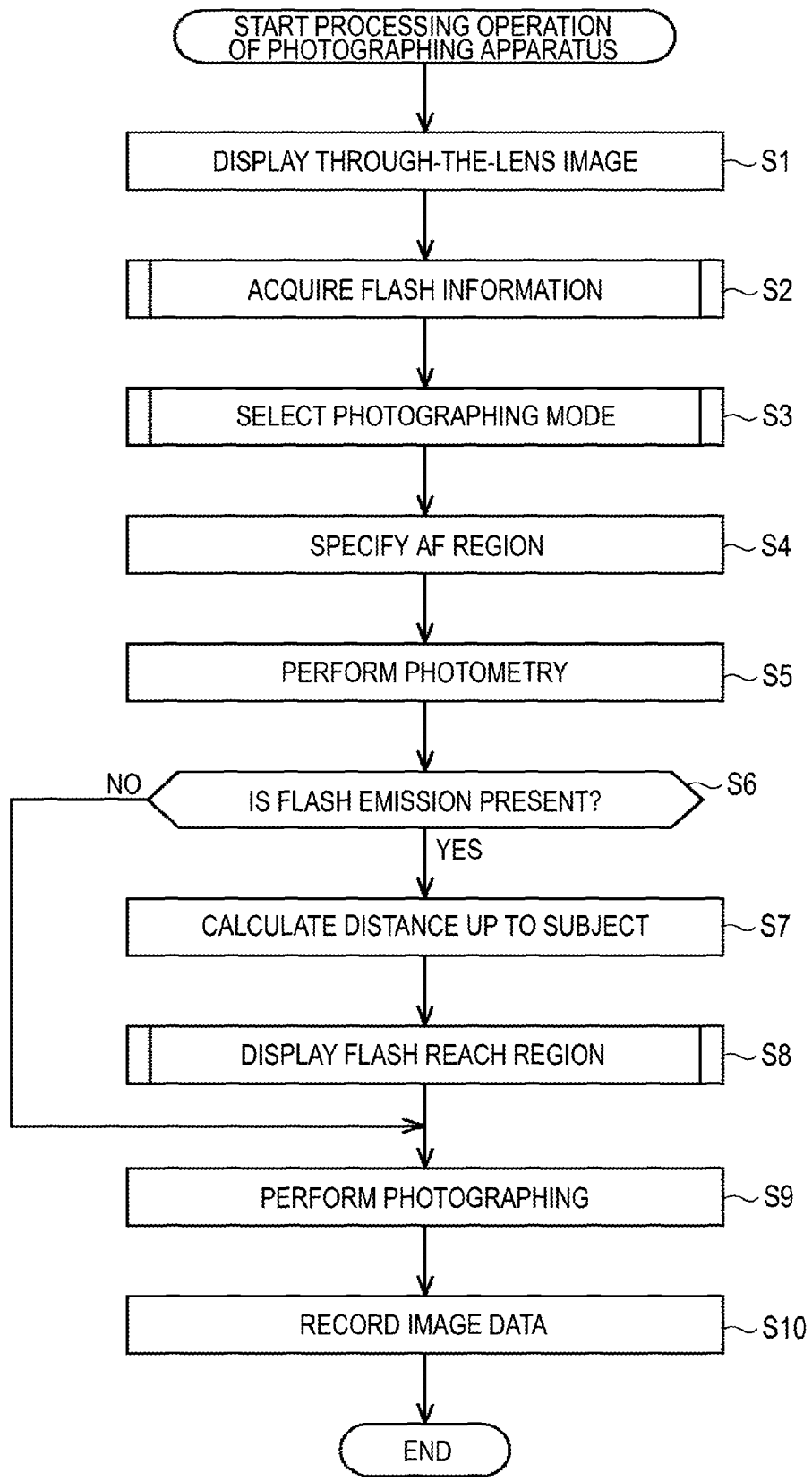
FIG. 6 is a flow diagram illustrating a process operation of the photographing apparatus.

After the guide number of the flash 22 which is a built-in flash is acquired in step S22, or after the guide number of the external flash is acquired in step S23, the process returns to step S2 of FIG. 6, and the process subsequent thereto is performed. Flash information including the guide number acquired by the flash information acquisition section 122 is supplied to the display control section 123.

Figure 9:
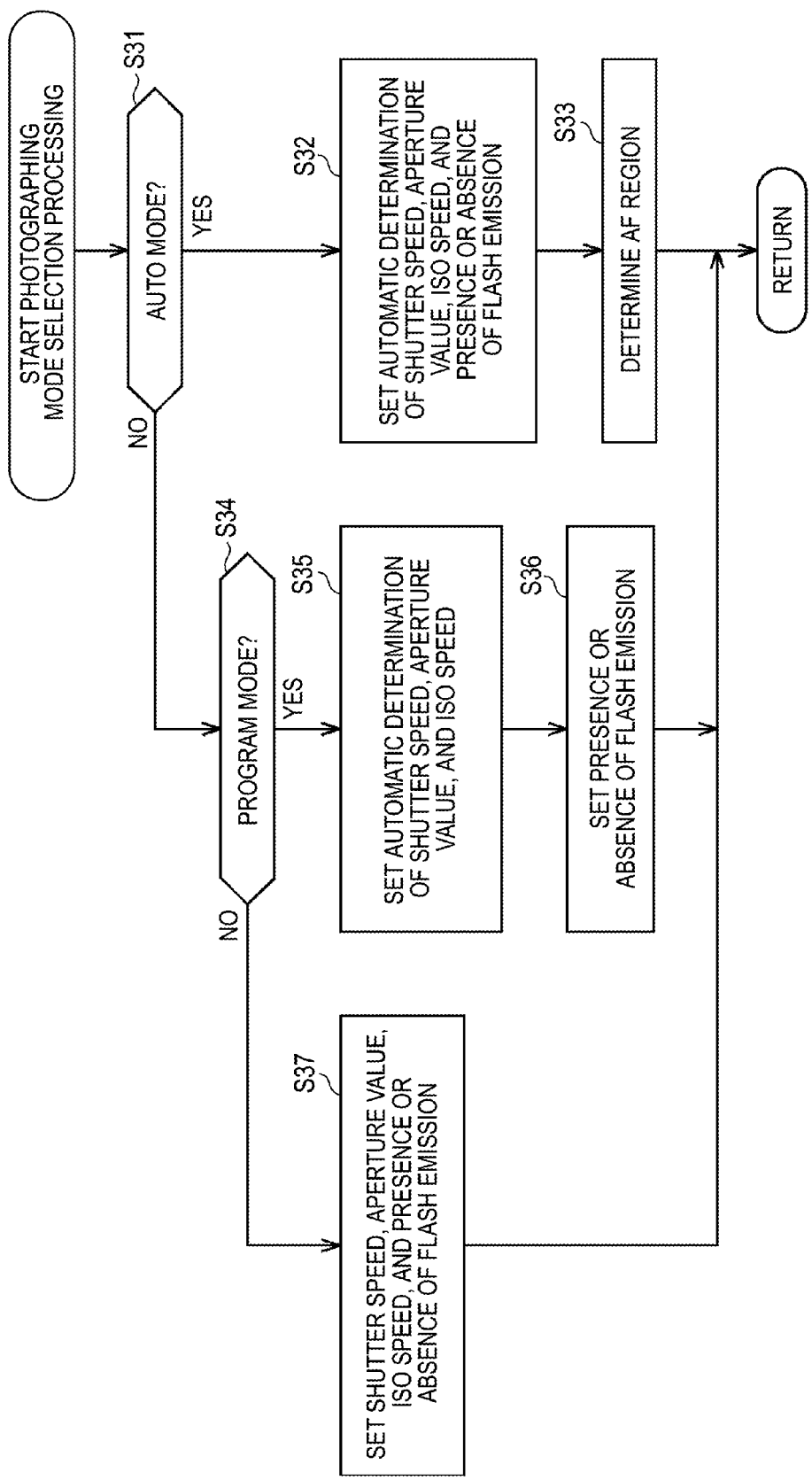
FIG. 9 is a flow diagram illustrating a photographing mode selection process performed in step S3 of FIG. 6.

Next, the photographing mode selection process performed in step S3 of FIG. 6 will be described with reference to a flow diagram of FIG. 9.

Here, a plurality of photographing modes is prepared in the photographing apparatus 1. A program mode such as a shutter speed priority AE mode and an aperture priority AE mode, and a manual mode are prepared in the photographing mode, in addition to the auto mode.

The auto mode is a mode in which the shutter speed, the aperture value, the ISO speed, the use or disuse of flash emission, and the AF region are selected automatically (without a user's operation) by the photographing apparatus 1 on the basis of the photometric result. The shutter speed priority AE mode is a mode in which the shutter speed is selected arbitrarily by a user, and accordingly, the aperture value and the ISO speed are automatically set by the photographing apparatus 1. The aperture priority AE mode is a mode in which the aperture value is selected arbitrarily by a user, and accordingly, the shutter speed and the ISO speed are automatically set by the photographing apparatus 1. In the program mode including the shutter speed priority AE mode and the aperture priority AE mode, the use or disuse of flash emission is selected arbitrarily by a user. The manual mode is a mode in which all the photographing parameters of the shutter speed, the aperture value, the ISO speed, and the use or disuse of flash emission are selected arbitrarily by a user.

A user displays the settings screen on the LCD 24, and selects a proper photographing mode from these photographing modes in accordance with the photographing conditions. In addition, when the photographing mode other than the auto mode is selected, a user selects whether to emit the flash 22 using the settings screen.

In step S31, the CPU 31 determines whether the photographing mode selected by a user is an auto mode.

When it is determined in step S31 that the photographing mode is an auto mode, in step S32, the CPU 31 sets so as to automatically determine the shutter speed, the aperture value, the ISO speed, and the use or disuse of emission of the flash 22, respectively. When such setting is performed, the CPU 31 determines each of the photographing parameters of the shutter speed, the aperture value, the ISO speed, and the use or disuse of flash emission, respectively, on the basis of the photometric result of step S5. As mentioned above, when the auto mode is set as a photographing mode and the luminance of the field obtained as a photometric result is darker than the threshold, it is determined that the flash emission is used.

In step S33, the CPU 31 determines an AF region. Here, the determined AF region is designated in the camera signal processing section 62 in step S4.

On the other hand, when it is determined in step S31 that the photographing mode is not an auto mode, in step S34, the CPU 31 determines whether the photographing mode is a program mode.

When it is determined in step S34 that the photographing mode is a program mode, in step S35, the CPU 31 sets so as to automatically determine a predetermined photographing parameter out of the shutter speed, the aperture value, and the ISO speed, respectively. That is, when the shutter speed priority AE mode is selected, the CPU 31 sets the shutter speed in accordance with the user's operation, and sets the aperture value and the ISO speed on the basis of the photometric result of step S5. On the other hand, when the aperture priority AE mode is selected, the CPU 31 sets the aperture value in accordance with the user's operation, and set the shutter speed and the ISO speed on the basis of the photometric result of step S5.

In step S36, the CPU 31 set the use or disuse of the emission of the flash 22 in accordance with the user's operation.

When it is determined in step S34 that the photographing mode is not a program mode but a manual mode, in step S37, the CPU 31 sets the shutter speed, the aperture value, the ISO speed, and the use or disuse of the emission of the flash 22 in accordance with the user's operation.

After the AF region is determined in step S33, and after the use or disuse of the emission of the flash 22 is set in step S36 or each of the photographing parameters is set in step S37, the process returns to step S3 of FIG. 6, and the process subsequent thereto is performed.

Next, the flash reach region display process performed in step S8 of FIG. 6 will be described with reference to a flow diagram of FIG. 10.

In step S41, the display control section 123 calculates a reach distance L of the flash light on the basis of the guide number acquired by the flash information acquisition section 122, and the aperture value and the ISO speed determined based on the photometric result. The reach distance L of the flash light is expressed by the following Expression (3).

$$L = (\text{guide number}) \div (\text{aperture value}) \times \sqrt{(\text{ISO speed} \div 100)} \quad (3)$$

In step S42, the display control section 123 compares the reach distance L of the flash light and the distance x up to each subject calculated in step S7, and specifies the subject which the flash light reaches.

Figure 11:
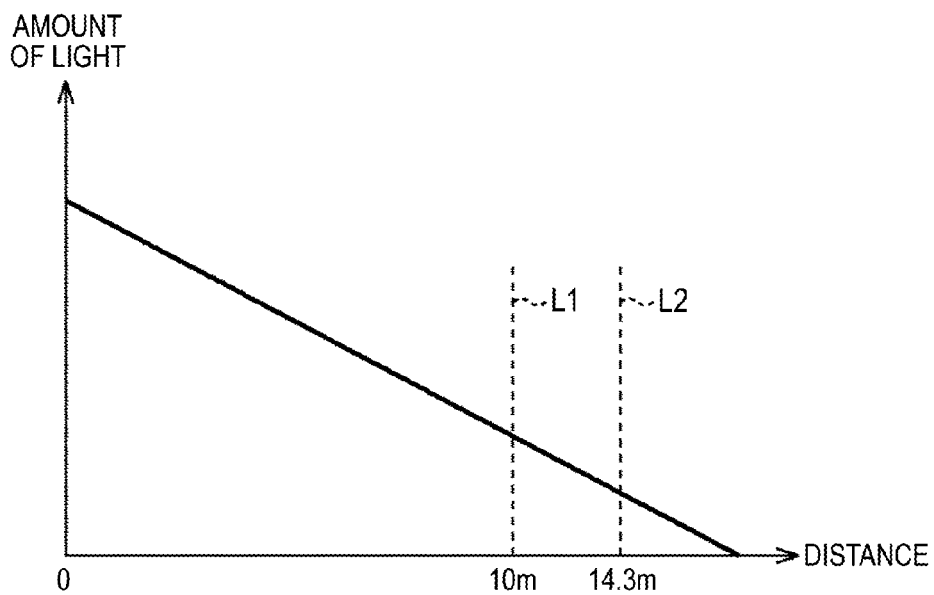
FIG. 11 is a conceptual diagram illustrating the reach distance of flash light.

FIG. 11 is a conceptual diagram illustrating the reach distance L of the flash light. The horizontal axis of FIG. 11 indicates a distance, and the vertical axis thereof indicates an amount of light (amount of light received in the imaging device 36) of the flash light. The straight line indicating the amount of light of the flash light in each distance is specified by the guide number of the flash 22, the aperture value, and the ISO speed.

For example, when the guide number of the flash 22 is 40, and the aperture value is F4.0, and the ISO speed is 100, the display control section 123 calculates the reach distance of the flash light as a distance of 10 m shown by the dashed line L1, from Expression (3). In this case, the display control section 123 determines which the flash light reaches the subject located closer than a distance of 10 m. When the aperture value and the ISO speed are fixed, the subject located closer than a distance of 10 m is brightly photographed, and the subject located farther than a distance of 10 m is darkly photographed.

The distance shown by the dashed line L2 is a distance at which the amount of light of the flash light is reduced by half compared to the amount of light in a position 10 m away. That is, when the subject is located at the distance shown by the dashed line L2 and taking a photograph through a correct exposure is attempted, it is necessary to capture an amount of light twice the amount of light when the subject located at a distance of 10 m is photographed. The distance shown by the dashed line L2 can be calculated as a distance of 14.3 m from Expression (3) by using an aperture value of F2.8 capable of capturing the amount of light two times an aperture value of F4.0. Meanwhile, in the case of this example, the distance of which the amount of light is reduced to zero is calculated as a distance of 18.6 m.

Figure 10:
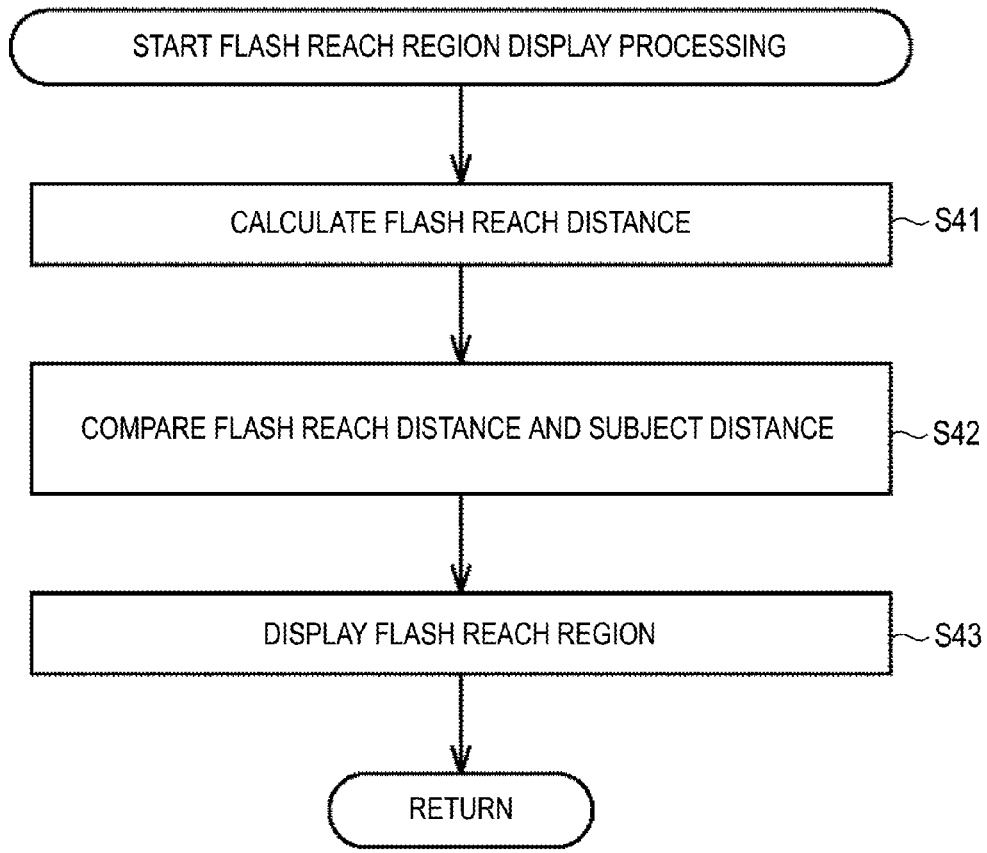
FIG. 10 is a flow diagram illustrating a flash reach region display process performed in step S8 of FIG. 6.

Returning to the description of FIG. 10, in step S43, the display control section 123 displays information indicating the flash reach region of each region of the through-the-lens image. After the information indicating the flash reach region is displayed, the process returns to step S8 of FIG. 6, and the process subsequent thereto is performed.

Figure 12:
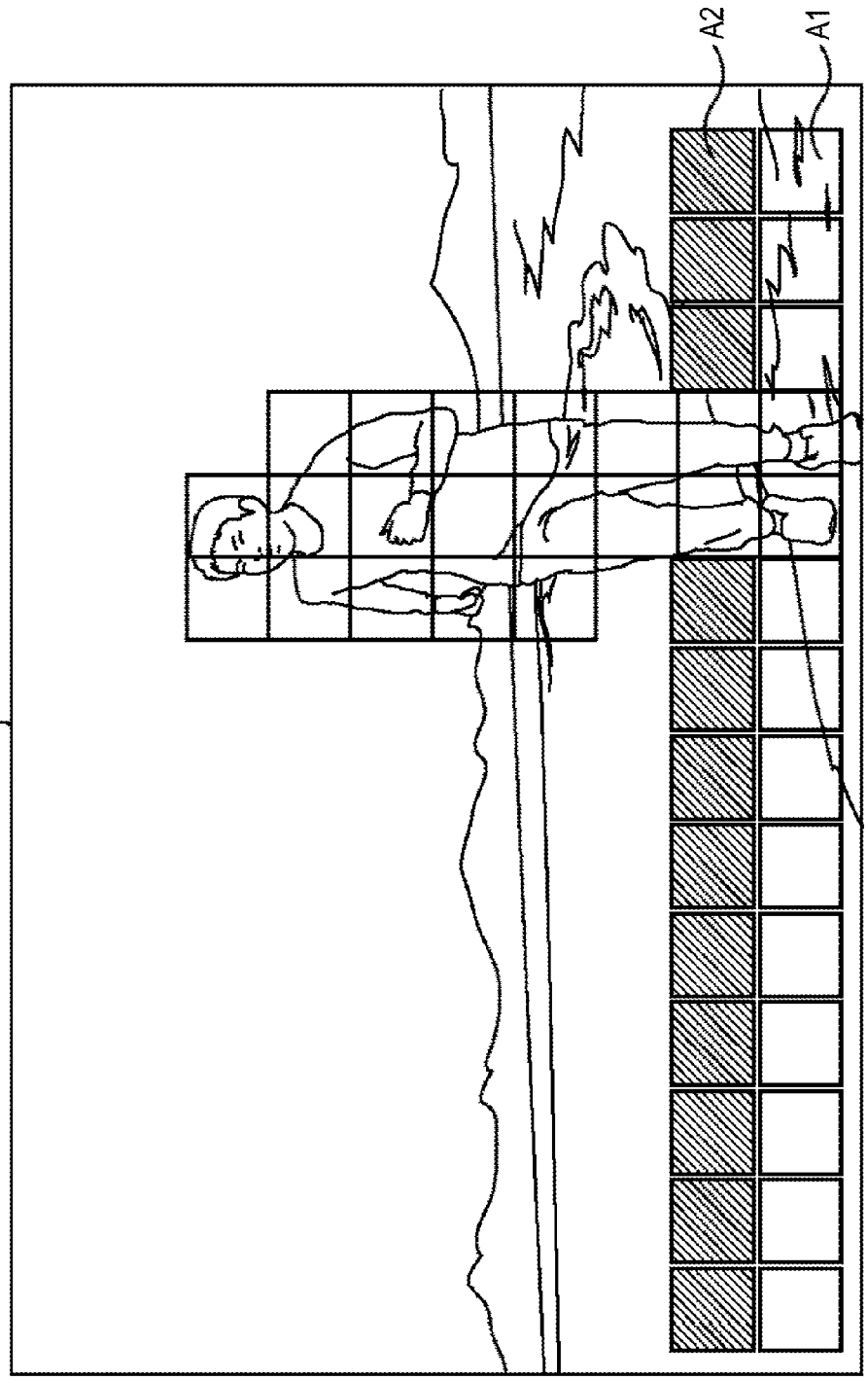
FIG. 12 is a diagram illustrating an example of a display of an LCD.

FIG. 12 is a diagram illustrating an example of the display of the LCD 24.

In the example of FIG. 12, an image in which one person is present in the substantially center with a landscape as a background is displayed on the LCD 24 as a through-the-lens image. The display control section 123 displays the flash reach region of the through-the-lens image in which the field is captured, by lighting or blinking in a predetermined color. In the example of FIG. 12, regions A1 which are white regions surrounded by the thick-line frames are the flash reach region, and each of the regions A1 is displayed by lighting or blinking in a predetermined color, so that the flash reach region is presented to a user.

Thereby, the user can determine that which subject the flash light reaches before taking a photograph. In addition, when the user determines which the flash light does not reach a subject which the user desires to capture in the presently set state, the user changes the setting of the photographing parameters by opening the aperture or raising the ISO speed, thereby allowing the image as intended to be photographed. When the setting of the photographing parameters is changed, the display control section 123 switches the display of the flash reach region by following the change of the setting by the user.

It is also possible to easily display information indicating that which subject the flash light reaches, in the photographing apparatus 1, without performing pre-emission.

It is also possible to display each region other than the flash reach region which is a region of the subject capable of being photographed through a correct exposure in accordance with the amount of light reaching the subject of the region.

Regions A2 indicated by the diagonal lines in FIG. 12 are regions other than the flash reach region, but indicate regions of the subject which the flash light reaches. In the example described with reference to FIG. 11, the region of the subject located farther than a distance of 10 m and closer than a distance of 18.6 m of which the amount of light is reduced to zero is a region other than the flash reach region, but becomes a region of the subject which the flash light reaches.

In this case, the display control section 123 displays the region A2 by lighting or blinking, in a step-by-step manner in accordance with the amount of light reaching the subject, for example, in a color lighter than the color of the region A1 indicating the flash reach region, or displays the region A2 by lighting or blinking in a color different from the color of the region A1. In the case where the region is displayed in a color lighter than the color of the region A1, the display control section 123 displays a region of the subject located at a distance of which the amount of light reaching the subject is reduced to ½, at a density of 50%, when the density of the color of the region A1 is set to 100%. In addition, the display control section 123 displays a region of the subject located at a distance of which the amount of light reaching the subject is reduced to ¼, at a density of 25%.

Thereby, the user can intuitively ascertain the amount of light of the flash light reaching each subject included in the field.

Modified Example

Advice about the setting change of the photographing parameters may be displayed without displaying information indicating the flash reach region or information indicating the amount of light reaching the subject.

In this case, for example, when the area of the flash reach region is smaller than the threshold with respect to the area of the entire field, the display control section 123 displays a message, showing the opening of the aperture or the raising of the ISO speed to a user, on the LCD 24. It is possible to prevent a user from photographing an overall dark image by confirming the message and changing the photographing parameters.

It is, of course, possible to display advice about the setting change of the photographing parameters along with information indicating the flash reach region or information indicating the amount of light reaching the subject.

In addition, a gain of image data of regions other than the flash reach region is made higher than that of image data of the flash reach region, or denoising is intensively performed, so that the contents of the image processing may be switched in accordance with the amount of light. In this case, the CPU 31 determines the amount of light of the flash light reaching the subject which is photographed in each region of an image captured by the imaging device 36, and controls the preprocessing section 37 or the camera DSP section 38 so that the image processing such as gain control or denoising is performed in accordance with the amount of light.

Although information indicating the flash reach region is displayed, information indicating a region of the subject which the flash light does not reach may be displayed.

Second Embodiment

External Configuration of Photographing Apparatus

As mentioned above, although the case in which the photographing apparatus 1 is a compact-type digital still camera has been described, the above-mentioned technique can also be applied to a single-lens reflex type digital still camera.

Figure 13:
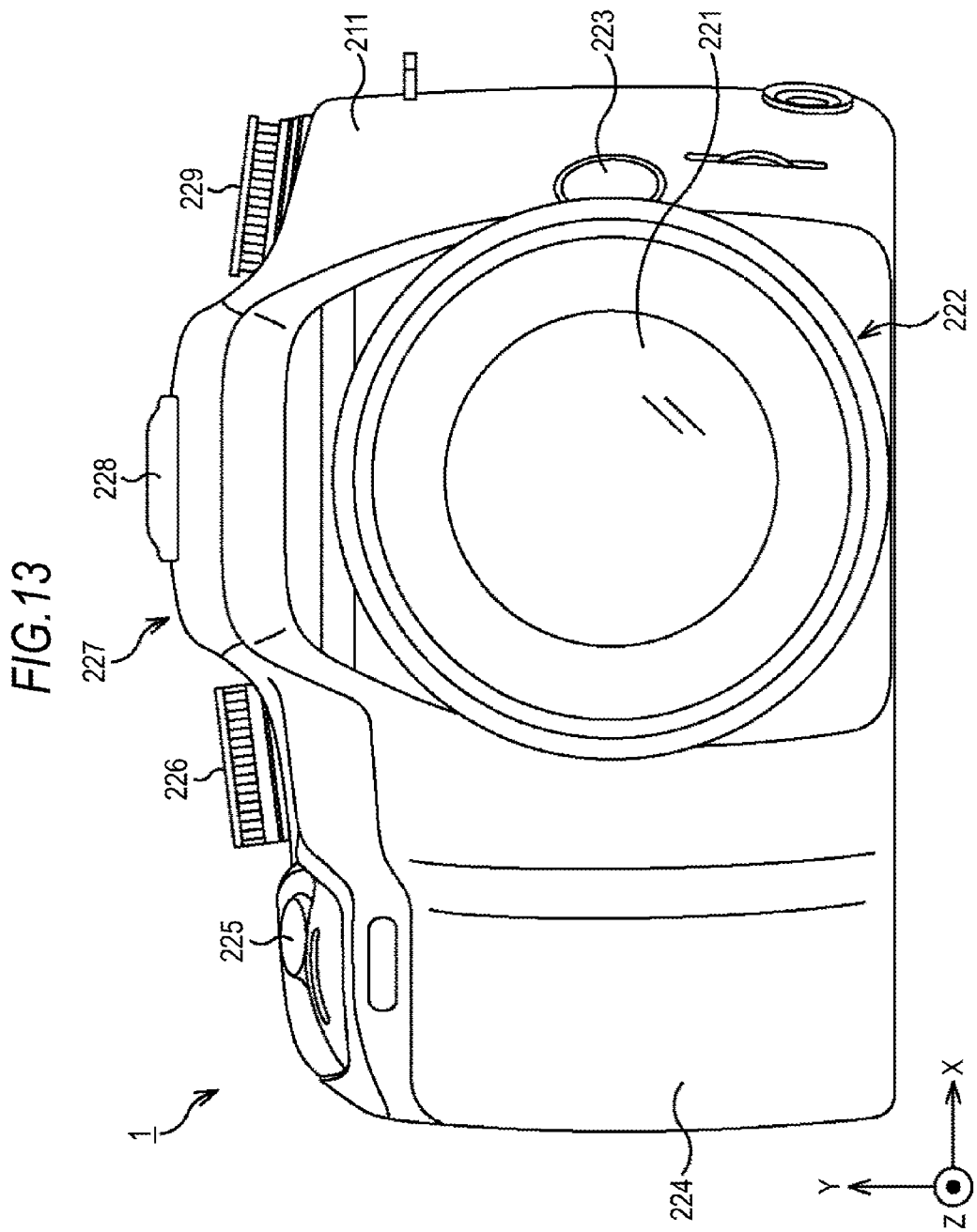
FIG. 13 is a diagram illustrating an example of the front appearance of a single-lens reflex type photographing apparatus.
Figure 14:
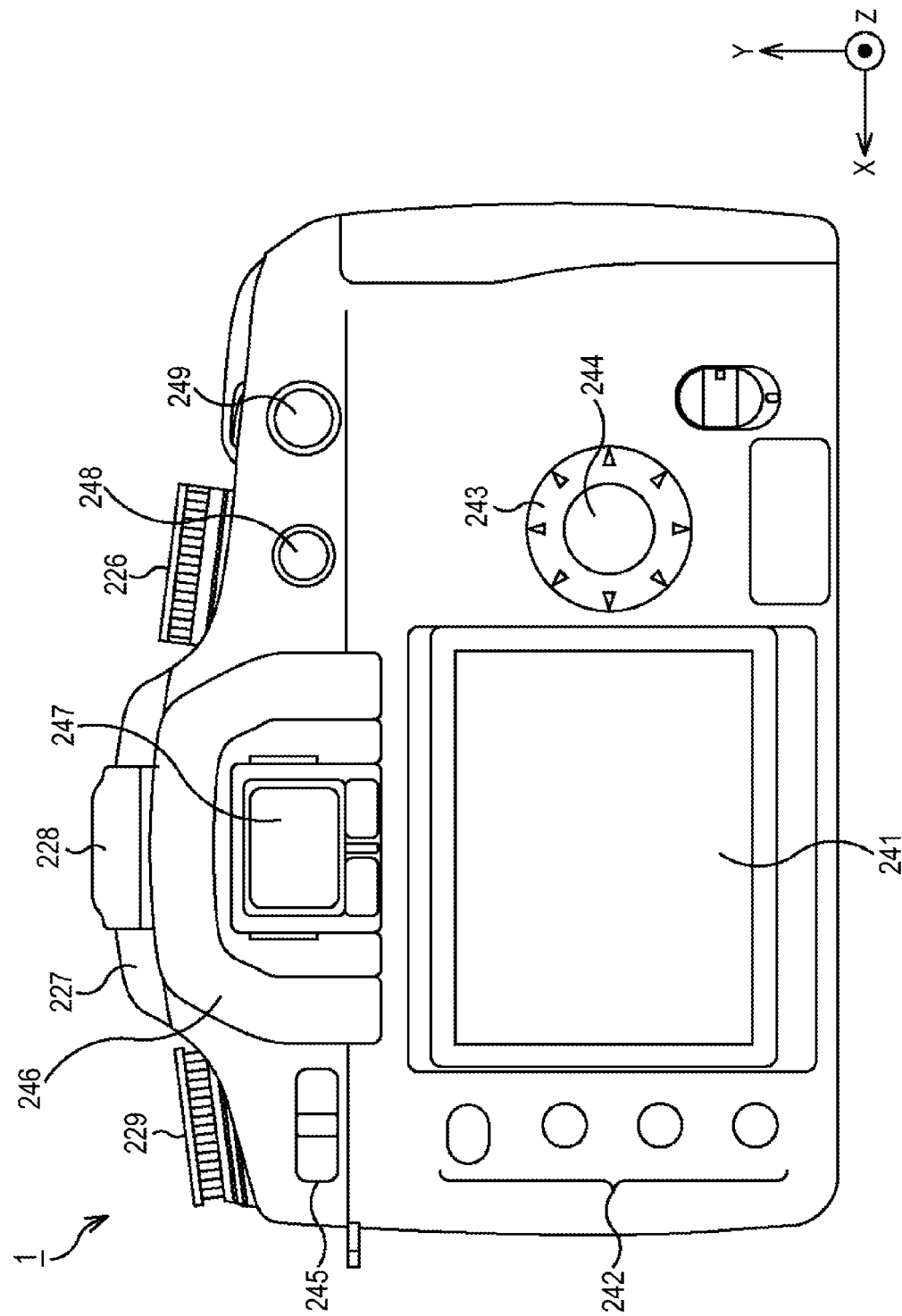
FIG. 14 is a diagram illustrating an example of the rear appearance of the single-lens reflex type photographing apparatus.

FIGS. 13 and 14 are diagrams illustrating an example of the appearance of the single-lens reflex type photographing apparatus 1. FIGS. 13 and 14 show a front view and a rear view, respectively. In addition, FIG. 15 is a longitudinal cross-sectional view illustrating the photographing apparatus 1.

The photographing apparatus 1 includes a camera body 211 and a lens 221 removably mounted on the camera body 211 as an interchangeable lens. In FIG. 13, amount portion 222 on which the lens 221 is mounted at approximately the center is provided at the front of the camera body 211. In addition, a lens interchanging button 223 is provided at the right side of the mount portion 222, and a grip portion 224 that a user can reliably grip with one hand (or both hands) is provided at the front left end (left side in the X direction).

The lens 221 functions as a lens window that captures light (light image) from a subject, and functions as a photographing optical system for leading the subject light to an imaging device 252 disposed in the inside of the camera body 211. The lens 221 can be removed from the camera body 211 by pushing down the lens interchanging button 223.

Figure 15:
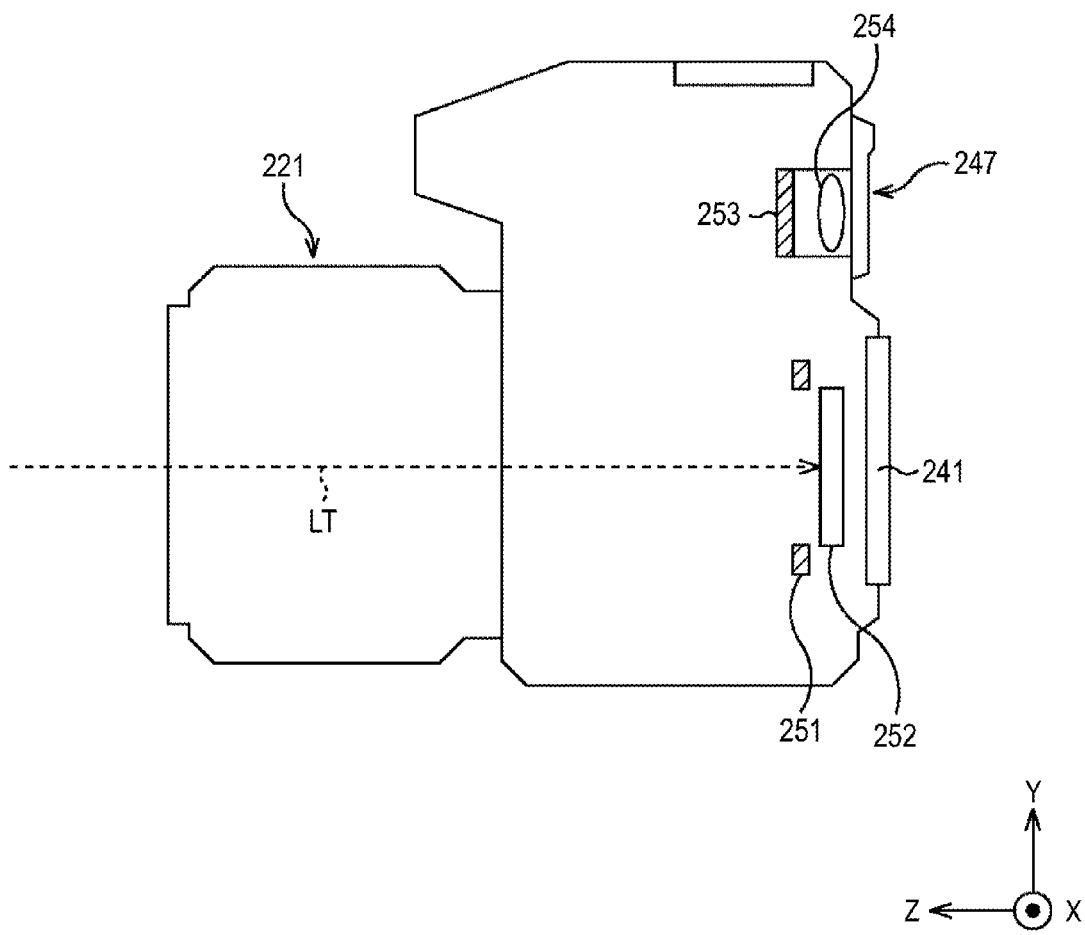
FIG. 15 is a longitudinal cross-sectional view of the photographing apparatus.

The lens 221 includes a lens group composed of a plurality of lenses serially disposed along the optical axis LT (FIG. 15). A focus lens for an adjustment of the focus and a zoom lens for a change in the magnification are included in the lens group, and each of lenses is driven in the direction of the optical axis LT, so that the change in the magnification or the adjustment of the focus is performed. In addition, an operation ring rotatable along the outer circumferential surface of the lens barrel of the lens 221 is included in the right place on the outer circumference of the lens barrel thereof. The above-mentioned zoom lens moves in the direction of the optical axis in accordance with the rotational direction of the operation ring and the amount of rotation, by the manual operation or the automatic operation, and is set to the zoom magnification (photographing magnification) in accordance with the position of the movement destination.

In addition, the camera body 211 is provided with a mode setting dial 226 disposed at the front upper-left portion (upper-left side in the Y direction), a control value setting dial 229 disposed at the front upper-right portion, and a shutter button 225 disposed on the upper surface of the grip portion 224. Meanwhile, the grip portion 224 may be provided with a grip sensor for detecting whether a user grips the grip portion 224.

Similarly to the shutter button 23 of FIG. 1, the shutter button 225 is a push-down switch that can be halfway pressed so as to be in the "half-pressed state" and can be further pressed so as to be in the "fully-pressed state".

The mode setting dial 226 and the control value setting dial 229 are made of an approximately disk-shaped member rotatable in the plane approximately parallel to the upper surface of the camera body 211. The mode setting dial 226 is used in selecting the photographing mode such as the auto mode and the program mode mentioned above. On the other hand, the control value setting dial 229 is to set control values for various types of functions added to the photographing apparatus 1.

A flash portion 227 corresponds to the flash 22 of FIG. 1, and is configured as a pop-up type built-in flash. When an external flash is installed on the camera body 211, a connection terminal portion 228 is used.

An LCD 241 (FIG. 14) provided at the rear side of the camera body 211 corresponds to the LCD 24 of FIG. 2. The LCD 241 includes a color liquid crystal panel capable of displaying an image, and performs the display of the throughthe-lens image which is an image of the field captured by the imaging device 252 (FIG. 15), the reproduction display of the recorded image, and the like. In addition, the LCD 241 displays the settings screen of functions or modes added to the photographing apparatus 1. Meanwhile, an organic EL or a plasma display device may be used in place of the LCD 241. The selection operation or the determination operation for various types of items displayed on the LCD 241 is performed using a cross key 243 and a push button 244 provided at the right side of the LCD 241.

A setting button group 242 provided the left side of the LCD 241 is a button that performs an operation for various types of functions added to the photographing apparatus 1. The setting button group 242 includes a selection settlement switch for settle the contents selected in the menu screen displayed on the LCD 241, a selection cancel switch, a menu display switch that switches the contents of the menu screen, a display on/off switch, and the like.

A main switch 245 is a two-contact slide switch sliding from side to side. When the main switch is set to the left, the power source of the photographing apparatus 1 is turned on, and when it is set to the right, the power source thereof is turned off.

An eye cup 246 is a U-shaped light-shielding member, having a light-shielding property, for suppressing infiltration of outside light into an EVF 247.

An exposure correction button 248 is a button for manually adjusting an exposure value (an aperture value or a shutter speed). An AE lock button 249 is a button for fixing an exposure.

[Internal Configuration of Photographing Apparatus]

FIG. 15 is a longitudinal cross-sectional view illustrating the photographing apparatus 1. As shown in FIG. 15, the imaging device 252 and the like are included in the inside of the camera body 211.

The imaging device 252 corresponds to the imaging device 36 provided in the photographing apparatus 1 of FIG. 1, and has the same configuration as that shown in FIG. 4. That is, the imaging device 252 is also an imaging device which is composed of a normal pixel and a phase difference pixel for detecting the phase difference by pupil-splitting subject light and has a function of detecting the phase difference on the device.

A shutter unit 251 is disposed ahead of the imaging device 252. The shutter unit 251 is configured as a mechanical focal plane shutter for performing a light path opening operation of subject light facing the imaging device 252 and a light path blocking operation. Meanwhile, the shutter unit 251 can be omitted when the imaging device 252 is an imaging device having a function of a fully electronic shutter.

The EVF 247 includes a liquid crystal panel 253 and an ocular lens 254. The liquid crystal panel 253 is configured as, for example, a color liquid crystal panel capable of displaying an image, and can display an image captured by the imaging device 252. The ocular lens 254 leads a subject image displayed on the liquid crystal panel 253 to the outside of the EVF 247. With such a configuration of the EVF 247, a user can have visual contact with the reproduction display of the through-the-lens image of the imaging device 252 and the photographed image.

Next, the electrical configuration of the camera body 211 will be described with reference to FIG. 16.

In addition to the shutter unit 251 and the imaging device 252, the camera body 211 is provided with an imaging device drive mechanism 271, an AFE 272, an image processing section 273, a phase difference AF calculation section 274, an image memory 275, an electric cell 276, and a power source control section 277. In addition, the camera body 211 is provided with a main control section 281, an operation section 282, a lens control section 283, a flash control section 284, a VRAM 285 (285*a* and 285*b*), a card I/F 286, a memory card 287, and a communication I/F 288.

The imaging device 252 performs the photoelectric conversion of light captured by the lens 221, and outputs an image signal to the AFE 272. In addition, the imaging device 252 also functions as a phase difference sensor, and outputs a phase difference signal, indicating the phase difference of light from the each subject included in the field, to the AFE 272.

The AFE 272 provides a timing pulse that causes the imaging device 252 to perform a predetermined operation, performs predetermined signal processing on an image signal output from the imaging device 252, and converts the image signal into a digital signal to output it to the image processing section 273. The AFE (analog front end) 272 is composed of a timing control section 301, a signal processing section 302, and an A/D conversion section 303.

The timing control section 301 generates a predetermined timing pulse on the basis of a reference clock output from the main control section 281 to output the timing pulse to the imaging device 252, and controls an imaging operation of the imaging device 252. A vertical scanning pulse φVn, a horizontal scanning pulse φVm, a reset signal φVr, and the like are included in the timing pulse. In addition, the timing control section 301 outputs a predetermined timing pulse to the signal processing section 302 and the A/D conversion section 303, respectively, to control the operations of the signal processing section 302 and the A/D conversion section 303.

The signal processing section 302 performs predetermined analog signal processing on an analog image signal and a phase difference signal output from the imaging device 252. The signal processing section 302 includes a CDS circuit, an AGC circuit, a clamping circuit, and the like.

The A/D conversion section 303 converts analog image signals of R, G, and B output from the signal processing section 302 into digital image signals constituted by a plurality of bits (for example, 12 bits) on the basis of the timing pulse output from the timing control section 301. In addition, the A/D conversion section 303 performs A/D conversion of the phase difference signal output from the phase difference pixel, and outputs phase difference information to a black level correction section 311.

The image processing section 273 performs predetermined signal processing on image data output from the AFE 272 to generate image data. The image processing section 273 is composed of the black level correction section 311, a WB processing section 312, and a gamma correction processing section 313. Meanwhile, image data incorporated into the image processing section 273 are once written in the image memory 275 in synchronization with readout of the imaging device 252, and then accesses the image data written in the image memory 275, and processing is performed in each of the blocks of the image processing section 273.

The black level correction section 311 corrects a black level of a digital image signal obtained by A/D conversion of the A/D conversion section 303 and a black level of phase difference information to a reference black level, and outputs the resultant. The phase difference information and the image signal after the black level correction of the black level correction section 311 are supplied to the WB processing section 312 and the phase difference AF calculation section 274. In addition, the phase difference information is supplied to the main control section 281 through a path which is not shown.

The WB processing section 312 performs level conversion (white balance (WB) adjustment) of the digital signals of each color component of R, G, and B, on the basis of a white reference depending on the light source. That is, the WB processing section 312 specifies the portion estimated to be originally white from luminance or chroma data and the like in the photographing subject, on the basis of WB adjustment data given from the main control section 281, calculates the average of color components of R, G, and B of the portion, and the G/R ratio and the G/B ratio, and level-corrects them as a correction gain of R and B.

The gamma correction processing section 313 corrects the grayscale characteristics of the WB adjusted image data. Specifically, the gamma correction processing section 313 non-linearly converts a level of image data using a gamma correction table which is previously set for each color component and performs offset adjustment.

The phase difference AF calculation section 274 calculates a focusing evaluation value of a selected AF point on the basis of the black level corrected phase difference information supplied from the black level correction section 311. The focusing evaluation value indicates, for example, AF deviation within an AF region which is set to a portion of (for example, central portion) the field. The focusing evaluation value calculated in the phase difference AF calculation section 274 is supplied to the main control section 281 through a path which is not shown.

The image memory 275 temporarily stores image data output from the image processing section 273, at the time of taking a photograph. The image memory 275 is a memory used as a working region in which predetermined processing is performed on the stored image data by the main control section 281. In addition, the image memory 275 temporarily stores image data read out from the memory card 287, at the time of reproduction.

The power source control section 277 is composed of, for example, a constant voltage circuit and the like, and generates a voltage for driving the entire photographing apparatus 1 of the control section such as the main control section 281, the imaging device 252, other various types of drive sections, and the like. Meanwhile, the control of electric conduction to the imaging device 252 is performed by a control signal supplied from the main control section 281 to the power source control section 277. The electric cell 276 includes a primary cell such as an alkaline dry cell, or a secondary cell such as a nickel-metal hydride battery, and is a power source that supplies power to the entire photographing apparatus 1.

The main control section 281 is composed of, for example, a microcomputer in which storage sections such as ROM for storing a control program or RAM for temporarily storing data is embedded, and controls operations of each section of the photographing apparatus 1. For example, the main control section 281 executes detection processing of a focusing position of the focus lens by the phase difference AF, on the basis of the focusing evaluation value calculated by the phase difference AF calculation section 274 and position information of the focus lens included in the lens 221 detected by the lens control section 283.

In the main control section 281, each of the function sections described with reference to FIG. 5 is realized by execution of a predetermined program. The distance calculation section 121 realized in the main control section 281 calculates the distance up to the subject on the basis of the phase difference information supplied from the black level correction section 311. In addition, the flash information acquisition section 122 acquire the guide number of the flash portion 227 as a built-in flash or the guide number of the external flash connected to the connection terminal portion 228. The display control section 123 performs a display of the flash reach region as mentioned above, using the distance up to the subject calculated by the distance calculation section 121 and the guide number acquired by the flash information acquisition section 122.

The operation section 282 includes the shutter button 225, the mode setting dial 226, the control value setting dial 229, the setting button group 242, the cross key 243, the push button 244, the main switch 245, and the like, and inputs operation information to the main control section 281.

The lens control section 283 generates a signal for driving the aperture of the lens 221 or a signal for driving the focus, on the basis of a control signal given from the main control section 281, and outputs the signal to the lens 221.

The flash control section 284 corresponds to the flash control section 61 of FIG. 3, and controls the emission amount of the external flash, connected to the flash portion 227 or the connection terminal portion 228, to the emission amount set by the main control section 281, in the flash photographing mode. The flash control section 284 emits the flash in accordance with photographing.

The VRAMs 285a and 285b have a storage capacity of the image signal corresponding to the number of pixels of the EVF 247 and the LCD 241. The VRAMs 285a and 285b are buffer memories between the main control section 281 and the EVF 247, and between the main control section 281 and the LCD 241.

The card I/F 286 is an interface in which signals can be transmitted and received between the memory card 287 and the main control section 281.

The memory card 287 is a storage medium that saves image data generated by the main control section 281.

The communication I/F 288 is an interface in which image data and the like can be transmitted to a personal computer or other external devices.

In the photographing apparatus 1 having such a configuration, flash reach region display processing similar to the processing described with reference to FIG. 6 is performed, and information indicating the flash reach region is displayed on the LCD 241.

Third Embodiment

Figure 17:
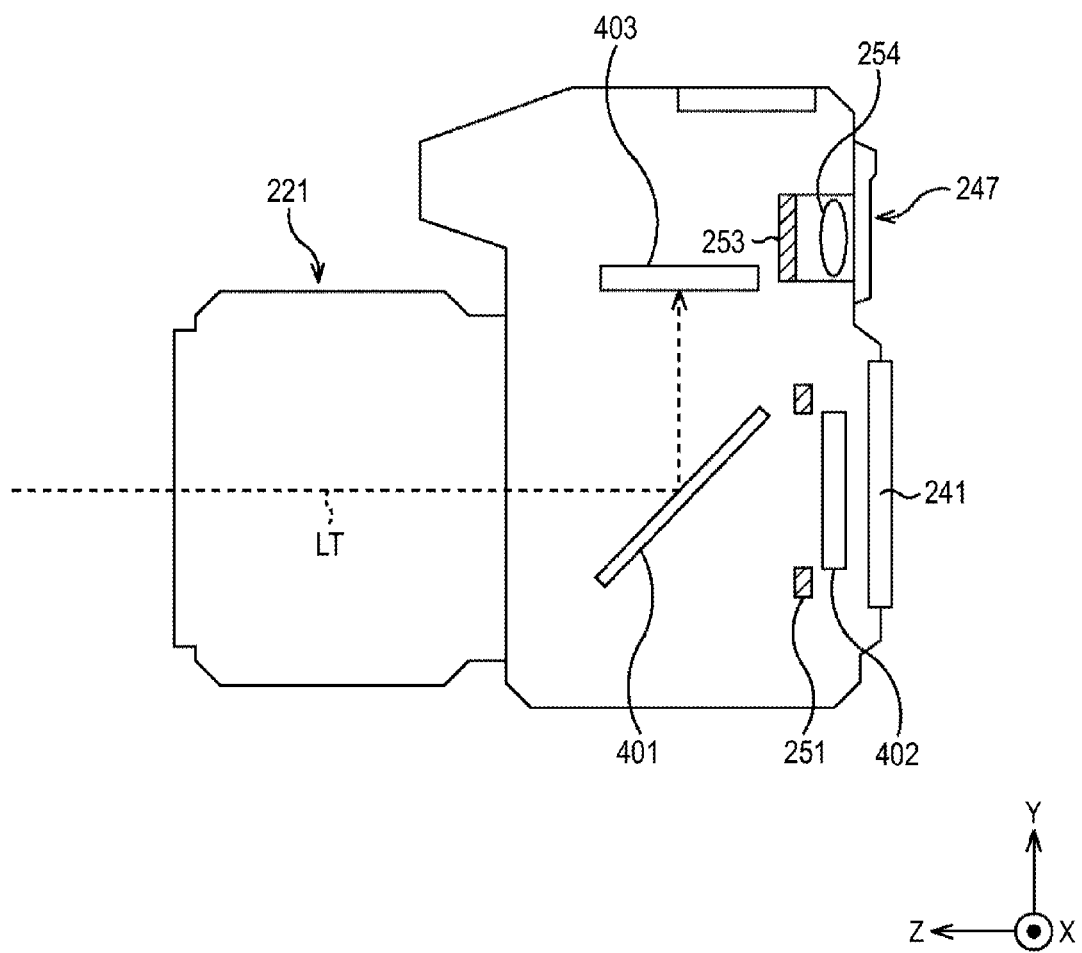
FIG. 17 is another longitudinal cross-sectional view of the photographing apparatus.

FIG. 17 is another longitudinal cross-sectional view of the single-lens reflex type photographing apparatus 1. The same signs and numerals are assigned to the same components as those shown in FIG. 15 of the components shown in FIG. 17. The repeated description will be appropriately omitted. Meanwhile, the external configuration of the photographing apparatus 1 shown in FIG. 17 is the same as those shown in FIGS. 13 and 14.

The photographing apparatus 1 of FIG. 17 is a photographing apparatus including an imaging device 403 for performing the capturing of a through-the-lens image and the phase difference detection, and an imaging device 402 for photographing a still image. The imaging devices 402 and 403 and a transmission mirror 401 are provided in the inside of the camera body 211.

The transmission mirror 401 is formed of a transmission and reflection member that reflects subject light toward the imaging device 403 provided on the upper portion of the camera body 211 and transmits the subject light toward the imaging device 402, and is fixed to the camera body 211. The ratio of transmission to reflection is set to 5:5, but can be arbitrarily changed depending on the characteristics of each imaging device. That is, in the subject light passing through the lens 221, some are transmitted through the transmission mirror 401 to be incident on the imaging device 402, and some are reflected by the transmission mirror 401 to be incident on the imaging device 403.

The imaging device 402 receives the subject light transmitted through the transmission mirror 401. As the imaging device 402, a CMOS type imaging device of a Bayer array is used in which a plurality of pixels having, for example, a photodiode is disposed two-dimensionally in a matrix shape, and color filters of, for example, R (red), G (green), and B (blue) having different spectral characteristics are respectively arranged on the light sensing surface of each pixel at a ratio of 1:2:1. The imaging device 402 generates analog electrical signal (image signal) of each color component of R (red), G (green), and B (blue) for an light image of the subject captured through the lens 221, and outputs the electrical signal as an image signal of each color of R, G, and B.

The imaging device 403 is disposed on the plane (XZ plane) perpendicular to the Y-axis, and receives subject light reflected by the transmission mirror 401. The imaging device 403 corresponds to the imaging device 36 provided in the photographing apparatus 1 of FIG. 1, and has the same configuration as that shown in FIG. 4. That is, the imaging device 403 is an imaging device which is composed of a normal pixel and a phase difference pixel for detecting the phase difference by pupil-splitting subject light and has a function of detecting the phase difference on the device.

Figure 18:
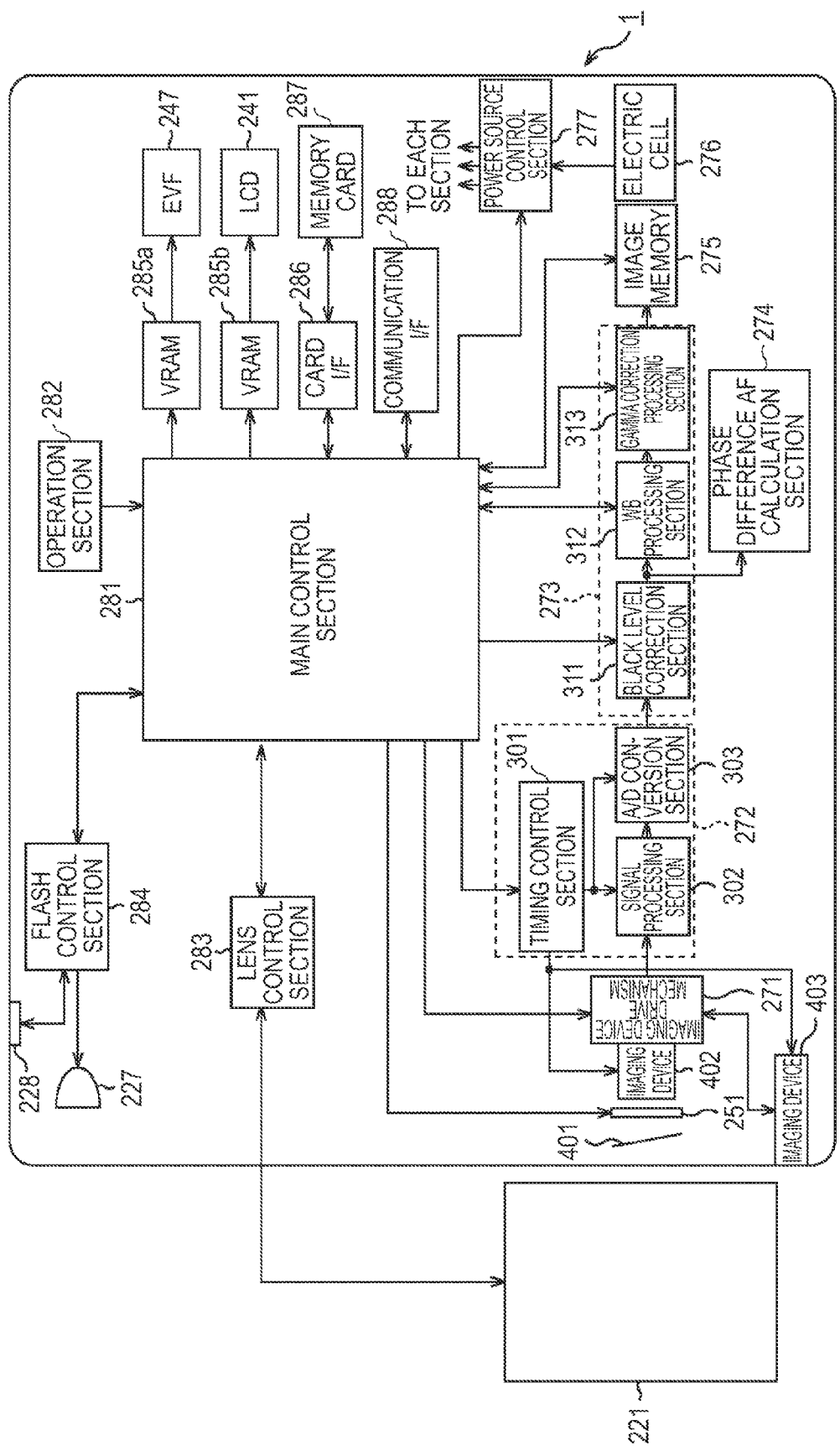
FIG. 18 is a diagram illustrating an example of the electrical configuration of the photographing apparatus of FIG. 17.

FIG. 18 is a diagram illustrating the electrical configuration of the photographing apparatus 1 shown in FIG. 17. The same signs and numerals are assigned to the same components as those shown in FIG. 16 of the components shown in FIG. 18. The repeated description will be appropriately omitted.

Figure 16:
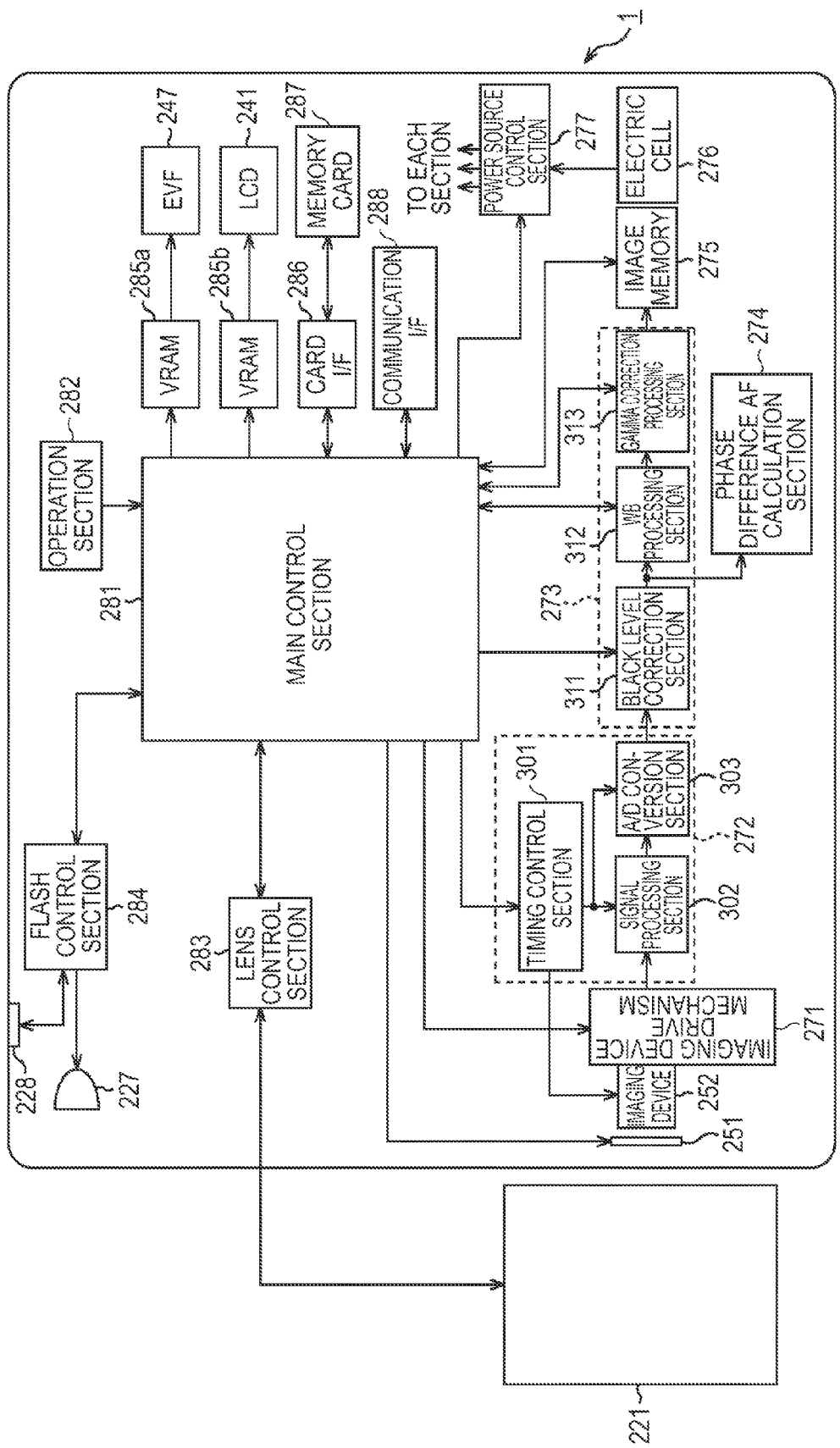
FIG. 16 is a diagram illustrating an example of the electrical configuration of the photographing apparatus.

The configuration of the photographing apparatus 1 shown in FIG. 18 is different from the configuration shown in FIG. 16 in that the transmission mirror 401 is provided at the front stage of the shutter unit 251, the imaging device 402 is provided in place of the imaging device 252 shown in FIG. 16, and the imaging device 403 is further added.

The AFE 272 provides a timing pulse that causes the imaging devices 402 and 403 to perform a predetermined operation, performs predetermined signal processing on an image signal output from the imaging devices 402 and 403, and converts the image signal into a digital signal to output it to the image processing section 273. The AFE 272 is composed of the timing control section 301, the signal processing section 302, and the A/D conversion section 303.

The timing control section 301 generates a predetermined timing pulse on the basis of a reference clock output from the main control section 281 to output the timing pulse to the imaging devices 402 and 403, and controls imaging operations of the imaging devices 402 and 403. In addition, the timing control section 301 outputs a predetermined timing pulse to the signal processing section 302 and the A/D conversion section 303, respectively, to control the operations of the signal processing section 302 and the A/D conversion section 303.

The signal processing section 302 performs predetermined analog signal processing on an analog image signal and a phase difference signal output from the imaging devices 402 and 403. The signal processing section 302 includes a CDS circuit, an AGC circuit, a clamping circuit, and the like. The image signal is supplied from the imaging device 402, and the image signal and the phase difference signal are supplied from the imaging device 403.

The A/D conversion section 303 converts analog image signals of R, G, and B output from the signal processing section 302 into digital image signals constituted by a plurality of bits (for example, 12 bits) on the basis of the timing pulse output from the timing control section 301. In addition, the A/D conversion section 303 performs A/D conversion of the phase difference signal output from the phase difference pixel, and outputs phase difference information to the black level correction section 311.

In the photographing apparatus 1 having such a configuration, flash reach region display processing similar to the processing described with reference to FIG. 6 is performed, and information indicating the flash reach region is displayed on the LCD 241.

As described above, the above-mentioned technique can also be applied to a single-lens reflex type digital still camera. Meanwhile, as a module used in detecting the phase difference, an existing phase difference AF module can also be used without using the imaging device, as shown in FIG. 4, in which a pixel functioning as a phase difference sensor is disposed at each position. The distance up to each subject is calculated on the basis of the phase difference of light from each subject detected in the phase difference AF module, and the display of the flash reach region is performed.

Configuration Example of Computer

A series of processing mentioned above can be executed by hardware, and can also be executed by software. When a series of processing is executed by software, a program constituting the software is installed in a computer incorporated in dedicated hardware, or a general-purpose personal computer and the like, from a program storage medium.

FIG. 19 is a block diagram illustrating a configuration example of hardware of a computer executing a series of processing mentioned above through a program.

A CPU (Central Processing Unit) 501, a ROM (Read Only Memory) 502, and a RAM (Random Access Memory) 503 are connected to each other through a bus 504.

An input and output interface 505 is further connected to the bus 504. An input section 506 such as a keyboard and a mouse and an output section 507 such as a display and a speaker are connected to the input and output interface 505. In addition, a storage section 508 such as a hard disk or a non-volatile memory, a communication section 509 such as a network interface, and a drive 510 that drives a removable medium 511 are connected to the input and output interface 505.

In the computer having such a configuration, the CPU 501 executes, for example, a program stored in the storage section 508 by loading the program into the RAM 503 through the input and output interface 505 and the bus 504, so that a series of processing mentioned above is performed.

A program executed by the CPU 501 is recorded in, for example, the removable medium 511, or is provided through wired or wireless transmission mediums such as local area networks, Internet, and digital broadcasting, and is installed in the storage section 508.

Meanwhile, the program executed by the computer may be a program on which processing is performed in a time-series manner along the procedure described in the specification, and may be a program on which processing is performed in parallel, or at a necessary timing when a call is performed.

The embodiments of the present disclosure are not limited to the above-mentioned embodiments, but various changes or modifications can be made without departing from the scope of the present disclosure.

It should be noted that the present disclosure can also take the following configurations.

1. A photographing apparatus including:
an imaging section;

a calculation section that calculates a distance up to a subject included in a photographing range of the imaging section; and a display control section that displays information indicating a region of the subject that light of a flash reaches, on the basis of the distance up to the subject and the emission amount of the flash.

2. The photographing apparatus according to the item 1, wherein the display control section displays information indicating the region of the subject which the flash light reaches in multi-stages, in accordance with the amount of light reaching the subject.

3. The photographing apparatus according to the item 1, wherein the display control section displays information indicating the region of the subject which the flash light reaches so as to be superimposed on an image captured by the imaging section.

4. The photographing apparatus according to the item 1, further including an image processing section that performs image processing of the image captured by the imaging section, for each region, in accordance with the amount of light of the flash reaching the subject photographed in each region of the image.

5. The photographing apparatus according to the item 1, wherein the imaging section includes a pixel that detects a phase difference of light from the subject, and the calculation section calculates the distance up to the subject on the basis of a signal which is output by the pixel of the imaging section.

6. The photographing apparatus according to the item 1, further including an acquisition section that acquires information indicating the emission amount from the flash externally mounted on the photographing apparatus or the flash built in the photographing apparatus, wherein the display control section displays information indicating the region of the subject which the flash light reaches, on the basis of the distance up to the subject calculated by the calculation section and the emission amount of the flash indicated by information which is acquired by the acquisition section.

7. A display control method including:

capturing an image by an imaging section;

calculating a distance up to a subject included in a photographing range of the imaging section; and displaying information indicating a region of the subject that light of a flash reaches, in multi-stages in accordance with the amount of light reaching the subject, on the basis of the distance up to the subject and the emission amount of the flash.

8. A program causing a computer to execute processing including:

capturing an image by an imaging section;

calculating a distance up to a subject included in a photographing range of the imaging section; and displaying information indicating a region of the subject that light of a flash reaches, in multi-stages in accordance with the amount of light reaching the subject, on the basis of the distance up to the subject and the emission amount of the flash.

The present disclosure contains subject matter related to that disclosed in Japanese Priority Patent Application JP 2011-020712 filed in the Japan Patent Office on Feb. 2, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus, comprising:

a display control section configured to control display of image data for an image, the image data including flash reach information identifying at least one portion of the image corresponding to at least one region reachable by light from a flash, wherein the flash reach information identifies the at least one portion of the image based at least partially upon a distance to the at least one region, wherein the display control section is configured to control display of the image such that portions of the image corresponding to regions located at different distances from the apparatus are displayed in a different manner based at least partially upon the flash reach information, and wherein the display control section is configured to change the flash reach information based upon a change in at least two of the distance, a guide number, an aperture value, and an ISO speed.

2. The apparatus of claim 1, further comprising:

a distance calculation section configured to calculate the distance to the at least one region.

3. The apparatus of claim 2, wherein the display control section calculates the flash reach information based upon a comparison between a reach distance of the light from the flash and the distance between the apparatus and the at least one region.

4. The apparatus of claim 3, wherein the display control section is configured to calculate a reach distance of light from the flash based upon the guide number, the aperture value, and the ISO speed.

5. The apparatus of claim 1, wherein the display control section is configured to control display of the image such that portions of the image corresponding to regions located at different distances from the apparatus are shown with a different density.

6. The apparatus of claim 1, wherein the flash reach information comprises first flash reach information and second flash reach information, wherein the at least one portion comprises a first portion of the image corresponding to a first region and a second portion of the image corresponding to a second region, wherein the first flash reach information identifies the first portion of the image and the second flash reach information identifies the second portion of the image, and wherein the first flash reach information identifies the first portion of the image in a different manner than the second flash reach information identifies the second portion of the image.

7. The apparatus of claim 1, wherein the flash reach information identifies a flash reach region, and, when an area of the flash reach region is smaller than a threshold with respect to an area of an entire field of the image, the display control section controls a message to be displayed.

8. The apparatus of claim 1, wherein the apparatus comprises a camera.

9. The apparatus of claim 1, further comprising a distance sensor.

10. The apparatus of claim 9, wherein the distance sensor comprises a phase difference pixel configured to detect a phase difference at least partially by splitting received light.

11. The apparatus of claim 1, wherein a first portion of the image corresponding to a first region of the at least one region reachable by light from the flash is displayed in a different manner from a second portion of the image corresponding to a second region outside of the at least one region reachable by light from the flash.

12. The apparatus of claim 1, wherein the display control section is configured to change the flash reach information based upon a change in the distance, the guide number, the aperture value, and the ISO speed.

13. A method, comprising:
controlling display of image data for an image, the image data including flash reach information identifying at least one portion of the image corresponding to at least one region reachable by light from a flash,
wherein the flash reach information identifies the at least one portion of the image based at least partially upon a distance to the at least one region,
wherein display of the image is controlled such that portions of the image corresponding to regions located at different distances from the apparatus are displayed in a different manner based at least partially upon the flash reach information, and
wherein the flash reach information is changed based upon a change in at least two of the distance, a guide number, an aperture value, and an ISO speed.

14. The method of claim 13, further comprising:
calculating a distance to the at least one region.

15. The method of claim 14, further comprising:
calculating the flash reach information at least partially based upon the distance to the at least one region.

16. The method of claim 15, further comprising:
changing the flash reach information based upon a change in the distance.

17. A computer-readable storage medium comprising instructions, which, when executed by a processor, perform a method, comprising:
controlling display of image data for an image, the image data including flash reach information identifying at least one portion of the image corresponding to at least one region reachable by light from a flash,
wherein the flash reach information identifies the at least one portion of the image based at least partially upon a distance to the at least one region,
wherein display of the image is controlled such that portions of the image corresponding to regions located at different distances from the apparatus are displayed in a different manner based at least partially upon the flash reach information, and
wherein the flash reach information is changed based upon a change in at least two of the distance, a guide number, an aperture value, and an ISO speed.

18. The computer-readable storage medium of claim 17, further comprising instructions, which, when executed, calculate a distance to the at least one region.

19. The computer-readable storage medium of claim 18, further comprising instructions, which, when executed, calculate the flash reach information at least partially based upon the distance to the at least one region.

20. The computer-readable storage medium of claim 17, wherein a first portion of the image corresponding to a first region of the at least one region reachable by light from the flash is displayed in a different manner from a second portion of the image corresponding to a second region outside of the at least one region reachable by light from the flash.

* * * * *